(12) United States Patent
Kowalski et al.

(10) Patent No.: US 12,408,100 B2
(45) Date of Patent: Sep. 2, 2025

(54) NETWORK-CONTROLLED REPEATER DEVICES, METHODS, AND NETWORKS INCLUDING SAME

(71) Applicant: Sharp Kabushiki Kaisha, Sakai (JP)

(72) Inventors: John Michael Kowalski, Vancouver, WA (US); Atsushi Ishii, Vancouver, WA (US); Zhanping Yin, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 201 days.

(21) Appl. No.: 17/582,278

(22) Filed: Jan. 24, 2022

(65) Prior Publication Data

US 2023/0239768 A1 Jul. 27, 2023

(51) Int. Cl.
*H04W 48/10* (2009.01)
*H04L 5/00* (2006.01)
*H04W 28/02* (2009.01)
*H04W 72/30* (2023.01)

(52) U.S. Cl.
CPC ........... *H04W 48/10* (2013.01); *H04L 5/0048* (2013.01); *H04W 28/0215* (2013.01); *H04W 72/30* (2023.01)

(58) Field of Classification Search
CPC . H04W 48/10; H04W 72/30; H04W 28/0215; H04L 5/0048
USPC ......................................................... 370/329
See application file for complete search history.

(56) References Cited

U.S. PATENT DOCUMENTS

| | | | |
|---|---|---|---|
| 2012/0039220 A1* | 2/2012 | Chen | H04L 5/0053 370/279 |
| 2012/0087299 A1* | 4/2012 | Bhattad | H04L 5/0053 370/315 |
| 2018/0220458 A1* | 8/2018 | Ouchi | H04L 27/01 |
| 2019/0044647 A1* | 2/2019 | Tomeba | H04L 5/0053 |
| 2021/0075497 A1* | 3/2021 | Tekgul | H04W 40/12 |
| 2024/0413942 A1* | 12/2024 | Hindy | H04B 7/0626 |

OTHER PUBLICATIONS

3GPP TS 38.300 v16.8.0, Technical Specification; 3$^{rd}$ Generation Partnership Project; Technical Specification Group Radio Access Network; NR; NR and NG-RAN Overall Description; Stage 2 (Release 16) (Dec. 2021).
3GPP TSG RAN Meeting #94e, RP-212703, Samsung, "Study on NR Smart Repeaters", Electronic Meeting, Dec. 6-17, 2021.
(Continued)

*Primary Examiner* — Intekhaab A Siddiquee
(74) *Attorney, Agent, or Firm* — NIXON & VANDERHYE P.C.

(57) ABSTRACT

A repeater node of a telecommunications network wirelessly communicates with a parent node and another node. The repeater node comprises receiver circuitry, processor circuitry, and transmitter circuitry. The receiver circuitry is configured to receive a frame of information from the parent node. The processor circuitry is configured to include a customized control signal in the frame of information received from the parent node. The customized control signal is customized for the repeater node. The transmitter circuitry is configured to transmit the frame of information which includes the customized control signal to the other node which may be a wireless terminal.

11 Claims, 9 Drawing Sheets

```
┌─────────────────────────────────────────────────────────┐
│ RECEIVING A FRAME OF INFORMATION FROM THE PARENT        │ 6-1
│ NODERECEIVING A FRAME OF INFORMATION FROM THE           │
│                    PARENT NODE                          │
└─────────────────────────────────────────────────────────┘
                            │
                            ▼
┌─────────────────────────────────────────────────────────┐
│ INCLUDING A CUSTOMIZED CONTROL SIGNAL IN THE FRAME      │ 6-2
│    OF INFORMATION RECEIVED FROM THE PARENT NODE         │
└─────────────────────────────────────────────────────────┘
                            │
                            ▼
┌─────────────────────────────────────────────────────────┐
│  TRANSMITTING THE FRAME OF INFORMATION WHICH            │ 6-3
│  INCLUDES THE CUSTOMIZED CONTROL SIGNAL TO THE          │
│                    ANOTHER NODE                         │
└─────────────────────────────────────────────────────────┘
```

(56) References Cited

OTHER PUBLICATIONS

3GPP TS 38.401 v16.8.0, Technical Specification, $3^{rd}$ Generation Partnership Project; Technical Specification Group Radio Access Network; NG-RAN; Architecture description (Release 16) (Dec. 2021).

3GPP TR 38.874 v16.0.0, Technical Specification, $3^{rd}$ Generation Partnership Project; Technical Specification Group Radio Access Network; NR; Study on Integrated Access and Backhaul (Release 16) (Dec. 2018.

3GPP TS 38.473 v16.8.0, Technical Specification, $3^{rd}$ Generation Partnership Project; Technical Specification Group Radio Access Network; NG-RAN; F1 application protocol (F1AP) (Release 16) (Dec. 2021).

3GPP TS 38.470 v16.5.0, Technical Specification, $3^{rd}$ Generation Partnership Project; Technical Specification Group Radio Access Network; NG-RAN; F1 general aspects and principles (Release 16) (Jul. 2021).

https://www.sharetechnote.com/html/5G/5G_ResourceGrid.html, retrieved on Nov. 11, 2022.

3GPP TS 38.211 v16.7.0, Technical Specification, $3^{rd}$ Generation Partnership Project; Technical Specification Group Radio Access Network; NR; Physical channels and modulation (Release 16) (Sep. 2021).

3GPP TS 38.213 v16.7.0, Technical Specification, $3^{rd}$ Generation Partnership Project; Technical Specification Group Radio Access Network; NR; Physical layer procedures for control (Release 16) (Sep. 2021).

3GPP TSG RAN Meeting #04e, RP-213700, ZTE Corporation, "New SI: Study on NR Network-controlled Repeaters", Electronic Meeting, Dec. 6-17, 2021.

\* cited by examiner

NETWORK-CONTROLLED REPEATER DEVICES, METHODS, AND NETWORKS INCLUDING SAME

TECHNICAL FIELD

The technology relates to wireless communications, and particularly to radio architecture and operation of wireless relay networks, including relay nodes of a type referred to as repeaters.

BACKGROUND

A radio access network typically resides between wireless devices, such as user equipment (UEs), mobile phones, mobile stations, or any other device having wireless termination, and a core network. Example of radio access network types includes the GRAN, GSM radio access network; the GERAN, which includes EDGE packet radio services; UTRAN, the UMTS radio access network; E-UTRAN, which includes Long-Term Evolution; and g-UTRAN, the New Radio (NR).

A radio access network may comprise one or more parent nodes, such as base station nodes, which facilitate wireless communication or otherwise provides an interface between a wireless terminal and a telecommunications system. A non-limiting example of a base station can include, depending on radio access technology type, a Node B ("NB"), an enhanced Node B ("eNB"), a home eNB ("HeNB"), a gNB (for a New Radio ["NR"] technology system), or some other similar terminology.

The 3rd Generation Partnership Project ("3GPP") is a group that, e.g., develops collaboration agreements such as 3GPP standards that aim to define globally applicable technical specifications and technical reports for wireless communication systems. Various 3GPP documents may describe certain aspects of radio access networks. Overall architecture for a fifth generation system, e.g., the 5G System, also called "NR" or "New Radio", as well as "NG" or "Next Generation", is shown in FIG. 1, and is also described in 3GPP TS 38.300. The 5G NR network is comprised of NG RAN (Next Generation Radio Access Network) and 5GC (5G Core Network). As shown, NGRAN is comprised of gNBs (e.g., 5G Base stations) and ng-eNBs (i.e. LTE base stations). An Xn interface exists between gNB-gNB, between (gNB)-(ng-eNB) and between (ng-eNB)-(ng-eNB). The Xn is the network interface between NG-RAN nodes. Xn-U stands for Xn User Plane interface and Xn-C stands for Xn Control Plane interface. A NG interface exists between 5GC and the base stations (i.e., gNB & ng-eNB). A gNB node provides NR user plane and control plane protocol terminations towards the UE and is connected via the NG interface to the 5GC. The 5G NR (New Radio) gNB is connected to AMF (Access and Mobility Management Function) and UPF (User Plane Function) in 5GC (5G Core Network).

In some cellular mobile communication systems and networks, such as Long-Term Evolution (LTE) and New Radio (NR), a service area is covered by one or more base stations, where each of such base stations may be connected to a core network by fixed-line backhaul links, e.g., optical fiber cables. In some instances, due to weak signals from the base station at the edge of the service area, users tend to experience performance issues, such as: reduced data rates, high probability of link failures, etc. A relay node concept has been introduced to expand the coverage area and increase the signal quality. As implemented, the relay node may be connected to the base station using a wireless backhaul link.

In $3^{rd}$ Generation Partnership Project (3GPP), the relay node concept for the fifth generation (5G) cellular system has been discussed and standardized, where the relay nodes may utilize the same 5G radio access technologies, e.g., New Radio (NR)) for the operation of services to User Equipment (UE) (access link) and connections to the core network (backhaul link) simultaneously. These radio links may be multiplexed in time, frequency, and/or space. This system may be referred to as Integrated Access and Backhaul (IAB).

Some such cellular mobile communication systems and networks may comprise IAB-donors and IAB-nodes, where an IAB-donor may provide interface to a core network to Ues and wireless backhauling functionality to IAB-nodes. Additionally, an IAB-node may provide IAB functionality combined with wireless self-backhauling capabilities. IAB-nodes may need to periodically perform inter-IAB-node discovery to detect new IAB-nodes in their vicinity based on cell-specific reference signals, e.g., Synchronization Signal and PBCH block SSB). The cell-specific reference signals may be broadcasted on a Physical Broadcast Channel (PBCH) where packets may be carried or broadcasted on the Master Information Block (MIB) section.

A radio frequency, RF, repeater is a type of relay node. A repeater node simply amplifies and forwards any signal that the repeater receives. Recently 3GPP Study Item Description draft document RP-212703 has been proposed for 3GPP RAN1, which concerns the specification of smart repeaters. As used herein, the term "smart repeater" will be used interchangeably with "Network Controlled Repeater" or "NCR."

Concerning smart repeaters, the 3GPP Study Item Description draft document RP-212703 explains:

A smart repeater is an enhancement over conventional RF repeaters with the capability to receive and process side control information from the network. Side control information could allow a smart repeater to perform its amplify-and-forward operation in a more efficient manner. Potential benefits could include mitigation of unnecessary noise amplification, transmissions and receptions with better spatial directivity, and simplified network integration.

As the RP-212703 points out, an Integrated Access and Backhaul node is a kind of repeater. In describing various scenario and assumptions RP-212703 states:

Smart repeaters are in-band RF repeaters used for extension of network coverage on FR1 and FR2 bands, while during the study FR2 deployments may be prioritized for both outdoor and O2I scenarios.

For only single hop stationary smart repeaters

Smart repeaters are transparent to UEs

Smart repeater can maintain the gNB-repeater link and repeater-UE link simultaneously NOTE1: Cost efficiency is a key consideration point for smart repeaters.

... side control information below is necessary for smart repeaters including assumption of max transmission power [RAN1]

Beamforming information

Timing information to align transmission/reception boundaries of smart repeater

Information on UL-DL TDD configuration

ON-OFF information for efficient interference management and improved energy efficiency Power control information for efficient interference management (as the $2^{nd}$ priority)

L1/L2 signaling (including its configuration) to carry the side control information [RAN1]

In the foregoing, FR1 is understood to be a carrier frequency range of up to 6 GHz, while FR2 is a frequency range of up to 70 GHz. "UL" and "DL" refer to uplink and downlink, respectively; "TDD" refers to time division duplex; and "O2I" refers to "Outdoor to Indoor."

What is needed are methods, apparatus, and/or techniques to enable smart repeaters to perform functions and capabilities that are not yet realized or specified.

SUMMARY

In one of its example aspects the technology described herein concerns a repeater node of a telecommunications network which wirelessly communicates with a parent node and another node. In a basic example embodiment and mode the repeater node comprises receiver circuitry, processor circuitry, and transmitter circuitry. The receiver circuitry is configured to receive a frame of information from the parent node. The processor circuitry is configured to include a customized control signal in the frame of information received from the parent node. The customized control signal is customized for the repeater node. The transmitter circuitry is configured to transmit the frame of information which includes the customized control signal to the other node which may be a wireless terminal. Example methods of operating such repeater node are also described.

In another of its example aspects the technology described herein concerns a parent node of a telecommunications network which wirelessly communicates with a repeater node. In a basic example embodiment and mode the parent node comprises processor circuitry and transmitter circuitry. The processor circuitry is configured to allocate, to the repeater node, available radio resources. The available radio resources are eligible for inclusion by the repeater node of a customized control signal. The customized control signal being customized for the repeater node. The transmitter circuitry is configured to transmit to the repeater node the frame of information which includes the available radio resources. Example methods of operating such parent node are also described.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

Figure 1:
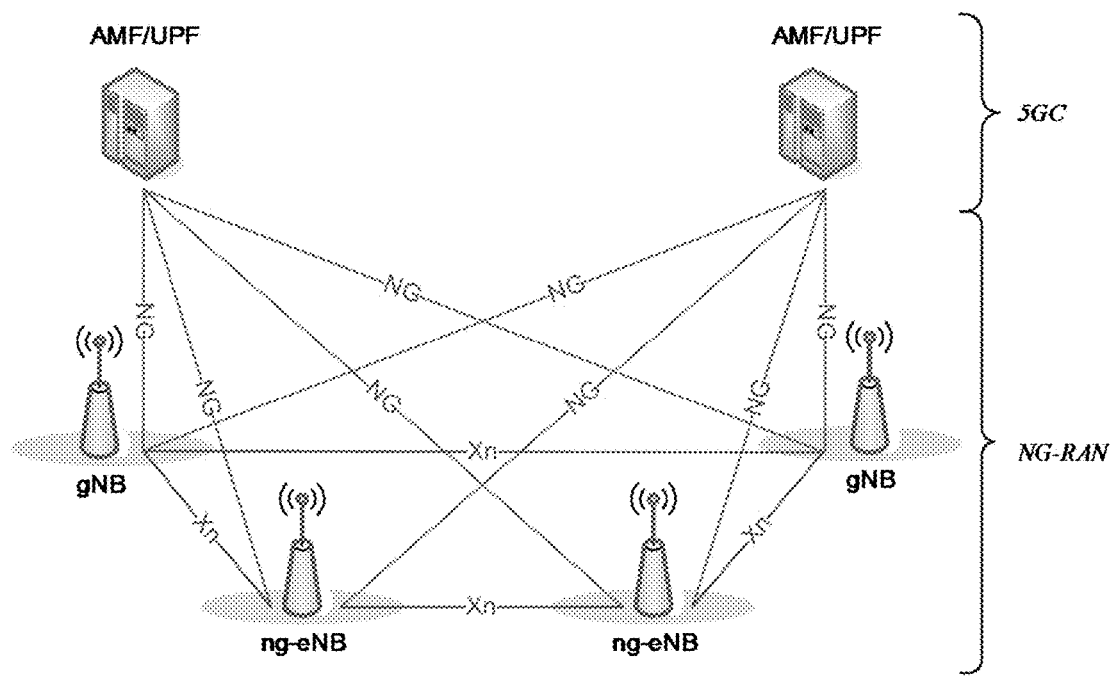
FIG. 1 is a diagrammatic view of overall architecture for a 5G New Radio system.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, tablets, netbooks, e-readers, wireless modems, etc.

As used herein, the term "parent node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a gNB (for a New Radio ["NR"] technology system), or some other similar terminology.

As used herein, the term "telecommunication system" or "communications system" can refer to any network of devices used to transmit information. A non-limiting example of a telecommunication system is a cellular network or other wireless communication system.

As used herein, the term "cellular network" or "cellular radio access network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information. Examples of cellular radio access networks include E-UTRAN, and any successors thereof (e.g., NUTRAN).

Any reference to a "resource" herein means "radio resource" unless otherwise clear from the context that another meaning is intended. In general, as used herein a radio resource ("resource") is a time-frequency unit that can carry information across a radio interface, e.g., either signal information or data information.

An example of a radio resource occurs in the context of a "frame" of information that is typically formatted and prepared, e.g., by a node. In Long Term Evolution (LTE) a frame, which may have both downlink portion(s) and uplink portion(s), is communicated between the base station and the wireless terminal. Each LTE frame may comprise plural subframes. For example, in the time domain, a 10 ms frame consists of ten one millisecond subframes. An LTE subframe is divided into two slots (so that there are thus 20 slots in a frame). The transmitted signal in each slot is described by a resource grid comprised of resource elements (RE). Each column of the two-dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. A resource element (RE) is the smallest time-frequency unit for downlink transmission in the subframe. That is, one symbol on one sub-carrier in the sub-frame comprises a resource element (RE) which is uniquely defined by an index pair (k,l) in a slot (where k and l are the indices in the frequency and time domain, respectively). In other words, one symbol on one sub-carrier is a resource element (RE). Each symbol comprises a number of sub-carriers in the frequency domain, depending on the channel bandwidth and configuration. The smallest time-frequency resource supported by the standard today is a set of plural subcarriers and plural symbols (e.g., plural resource elements (RE)) and is called a resource block (RB). A resource block may comprise, for example, 84 resource elements, i.e., 12 subcarriers and 7 symbols, in case of normal cyclic prefix In 5G New Radio ("NR"), a frame consists of 10 ms duration. A frame consists of 10 subframes with each having 1 ms duration which is similar to LTE. Each subframe consists of $2^\mu$ slots. Each slot can have either 14 (normal CP) or 12 (extended CP) OFDM symbols. A Slot is typical unit for transmission used by scheduling mechanism. NR allows transmission to start at any OFDM symbol and to last only as many symbols as required for communication. This is known as "mini-slot" transmission. This facilitates very low latency for critical data communication as well as minimizes interference to other RF links. Mini-slot helps to achieve lower latency in 5G NR architecture. Unlike slot, mini-slots are not tied to the frame structure. It helps in puncturing the existing frame without waiting to be scheduled. See, for example, https://www.rfwireless-world.com/5G/5G-NR-Mini-Slot.html, which is incorporated herein by reference.

A mobile network used in wireless networks may be where the source and destination are interconnected by way of a plurality of nodes. In such a network, the source and destination may not be able to communicate with each other directly due to the distance between the source and destination being greater than the transmission range of the nodes. That is, a need exists for intermediate node(s) to repeat or relay communications and provide transmission of information. Accordingly, intermediate node(s) may be used to repeat or relay information signals in a relay network, having a network topology where the source and destination are interconnected by means of such intermediate nodes. In a hierarchical telecommunications network, the backhaul portion of the network may comprise the intermediate links between the core network and the small subnetworks of the entire hierarchical network. Integrated Access and Backhaul (IAB) Next generation NodeB use 5G New Radio communications such as transmitting and receiving NR User Plane (U-Plane) data traffic and NR Control Plane (C-Plane) data. Both, the UE and gNB may include addressable memory in electronic communication with a processor. In one embodiment, instructions may be stored in the memory and are executable to process received packets and/or transmit packets according to different protocols, for example, Medium Access Control (MAC) Protocol and/or Radio Link Control (RLC) Protocol.

Radio Resource Control (RRC) protocol may be used for signaling between 5G radio network and UE, where RRC may have at least two states (e.g., RRC_IDLE and RRC_CONNECTED) and state transitions, and the RRC_CON- NECTED state may include two substrates, ACTIVE and INACTIVE. The RRC sublayer may enable establishing of connections based on the broadcasted system information and may also include a security procedure. The U-Plane may comprise of PHY, MAC, RLC and PDCP layers.

The technology described herein concerns various architectures related to protocol architectures for relays and describes, e.g., at an architectural level, how relay nodes and/or repeater nodes may be connected and their characteristics. For example, the technology described herein concerns architecture, functions and capabilities of a repeater node derived from an integrated access and backhaul node and of a UE, as well as architecture, functions and capabilities of a parent node and wireless terminal which communicate with the repeater node The repeater node lacks the layers above the Physical Layer on the service link side and appears as a UE to a parent node on the backhaul side.

In addition, the technology described herein discloses example techniques whereby time/frequency resources may be allocated by a parent node such as a Donor Node, DN, which is the gNB supplying time frequency resources to the repeater node or NCR, for the purpose of repeating the uplink and downlink to UEs on the repeater-UE link via the NCR. For example, the technology described herein describes example configuration and use of physical and radio link parameters for the serving link of a network-controlled repeater via replacement of non-information bearing signals and broadcast signals of the backhaul link with those specified in information elements of a (re)configuration message. As indicated above, the repeater node(s) of the technology described herein are said to be a "smart repeater" in that, for example, the repeater node(s) provide and generate a repeater customized control signal. The repeater node(s) are also said to be "network-controlled" in the sense that the network, e.g., via the parent node, supplies the time frequency resources that facilitate the repeater node to insert the repeater customized control signal in a frame which is transmitted on a wireless access link.

In addition, the technology described herein provides a smart repeater node with features and benefits heretofore unrealized, such as beamforming and spatial multiplexing on an amplify and forward repeater, as well as separate routing on a single hop link. Beamforming is the application of multiple radiating elements transmitting the same signal at an identical wavelength and phase, which combine to create a single antenna with a longer, more targeted stream which is formed by reinforcing the waves in a specific direction.

An example benefit provided by the technology described herein are repeater nodes which facilitate beamforming and/or the use multiple-in/multiple-out, MIMO, antenna technology, which is useful for exploiting the high capability for millimeter wave spectrum to carry large amounts of data to a given unit area. Millimeter wave spectrum prefers not to propagate through walls. On the other hand, in at least some example embodiment and modes the repeater nodes of the technology described herein can be used to bring millimeter wave spectrum from the inside to the outside and vice-versa. For example, the antennas which connect the repeater nodes of the technology described herein to the backhaul link/donor node may be outdoors, and the antennas of the repeater node(s) of the technology described herein which connect the repeater node(s) to its access links may be indoors, and yet the repeater node(s) maintain transparency of wireless terminal links relayed to a gNB.

Figure 2:
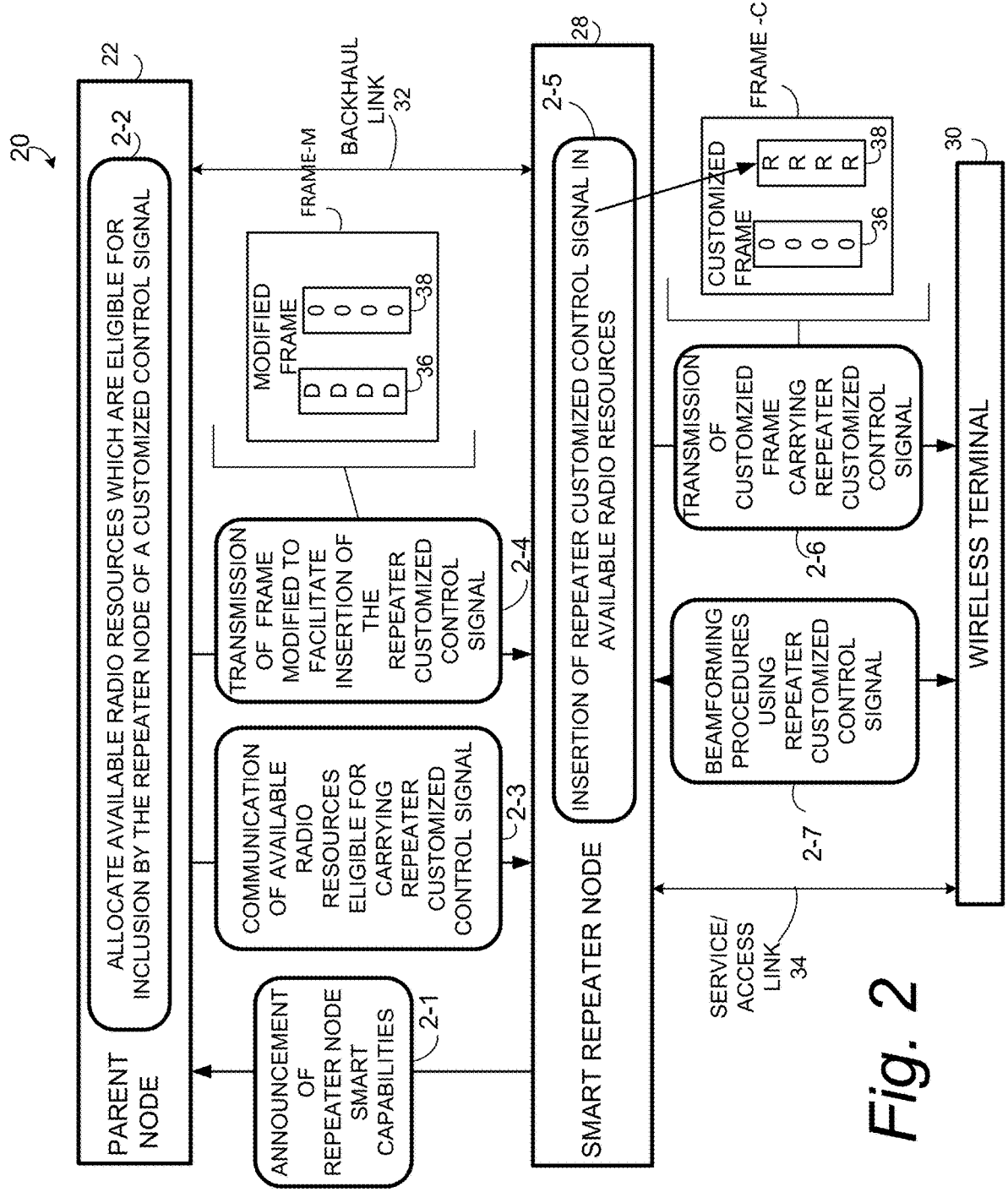
FIG. 2 is a diagrammatic view illustrating, in simplified form, a telecommunications system comprising a parent node and a smart repeater node according to an example embodiment and mode, showing various example representative aspects of the technology described herein.

According to the technology described herein, FIG. 2 illustrates, in simplified form, an example, representative telecommunications system 20 comprising a parent node 22; a wireless repeater node 28; and a wireless child node 30.

The parent node 22 wirelessly communicates with the repeater node 28. The parent node 22 may be, for example, a base station node, e.g., an eNodeB, gNodeB, gNB, or an access node which is either directly or indirectly connected or in communication with a core network. The parent node may be an Integrated Access and Backhaul (IAB) node, for example. In a case that the parent node includes a radio resource control entity, RRC entity, the parent node may be considered a "donor node". The parent node 22 may provide network access for other nodes, e.g., to other wireless terminals, although the parent node providing such access to other nodes may be irrelevant to the repeater node 28.

The repeater node 28 of FIG. 2 and as described herein is also referred to as a "smart repeater node", SR, or "network-controlled repeater", NCR, since, e.g., the repeater node 28 has the capability to generate one or more repeater-customized control signals, as described herein. The parent node 22 and the repeater node 28 may be connected by wireless backhaul link 32. The repeater node 28 and wireless terminal 30 may be connected by a wireless access link 34, also referred to as a service link 34, or simply link 34.

The child node 30 may be, for example, a user equipment, UE, or a wireless Integrated Access and Backhaul (IAB) node, but for simplicity is primarily described herein as wireless terminal 30. As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, tablets, netbooks, e-readers, wireless modems, etc. The wireless terminal may comprise a modem for wireless handset, a modem for IoT devices, etc. supporting voice, data, video applications etc.

FIG. 2 also illustrates various non-limiting aspects of the technology described herein. The example aspects are depicted by symbols 2-1 through 2-7. Each of the symbols bear text which briefly refer, in non-exhaustive fashion, to example features and/or operations of the various example aspects. Aspect 2-1 represents an announcement, by repeater node 28, of the repeater node smart capabilities. As explained herein, the repeater node smart capabilities include the ability of the repeater node 28 to insert a repeater's customized control signal in a frame of information which is to be transmitted to wireless terminal 30. As used herein, "customized control signal" and "repeater customized control signal" may refer to one or more control signals, such as side control signals, which are customized by or for the repeater node 28. "Customized" means that the control signal is configured by or for the repeater node 28 in view of an individual determination of the repeater node's own local circumstances or situation or operation, and therefore is not presumed, generated, or considered by the network to be applicable to other nodes by a general determination for plural nodes. For example, and as also further explained herein, the repeater's customized control signal may be one or more of a reference signal RS; channel state information, CSI; and a signal synchronization block, SSB, including a broadcast channel such as the Physical Broadcast Channel. A Channel State Information Reference Signal, CSI-RS, is a reference signal, RS. that is used in the Downlink (DL) direction in 5G NR, for the purpose of Channel Sounding and used to measure the characteristics of a radio channel so that it can use correct modulation, code rate, beam forming etc. Further, the repeater's customized control signal may be useful in performance of a beamforming operation, as depicted by aspect 2-7.

Aspect 2-2 represents allocation, at the repeater node, of available radio resources. As used herein, "available radio resources" comprise radio resources, e.g., of a radio resource frames, and as such include resource elements, Bandwidth Parts, Demodulation Reference Signals (DMRS), Channel State Information Reference Signals (CS-RSs), Primary and Secondary Synchronization Signals (PSS and SSS respectively), etc. which are eligible for inclusion, by the repeater node, of a customized control signal.

Aspect 2-3 of FIG. 2 represents a communication from or by the parent node 22 to the repeater node 28 of the available radio resources (as determined in aspect 2-2) which are eligible for carrying the repeater's customized control signal. Example of messages which may comprise the communication of aspect 2-3 are described herein, and may include a (re)configuration message, and particularly information elements such as ServingCellConfigCommon, tdd-UL-DL-ConfigurationCommon, and tdd-UL-DL-ConfigurationDedicated-LAB-MT, as described herein.

Aspect 2-4 of FIG. 2 represents transmission of a frame of information which has been modified to enable the repeater to insert the customized control signal. A modified frame may be derived from but in at least some respects is different from an ordinary frame that includes information for downlink transmission. As used herein a "modified" frame is a frame that has been altered or formatted to provide or allocate radio resources to enable the repeater node 28 to insert the repeater customized control signal. For example, a modified frame may include certain radio resources that are transmitted with zero power to provide the repeater node with an opportunity to insert the repeater customized control signal into those radio resources. After insertion of the repeater customized control signal into the frame, the frame for transmission to the wireless terminal 30 becomes a "customized" frame. The modified frame is transmitted in aspect 2-4 over the wireless backhaul link 32 from parent node 22 to repeater node 28.

In conjunction with aspect 2-4 FIG. 2 illustrates a simplified, representative modified frame M. The modified frame M includes a set of radio resources 36 which include default control signals which would be included in an ordinary, un-modified frame. The default control signals of set 36 are illustrated with contents "DDDD". The frame M has been "modified" to also include or designate a set of radio resources 38 which are the available radio resource(s) and which are eligible for carrying the repeater's customized control signal. Such available resources of set 38 are illustrated with example contents "0000". The contents "0000" signify that, in an example embodiment, the available radio resources are transmitted with zero power.

Aspect 2-5 of FIG. 2 represents insertion, by the repeater node 28, of the repeater customized control signals in the available radio resources of the modified frame, which results in the customized frame.

Aspect 2-6 of FIG. 2 represents transmission, by the repeater node 28, of the customized frame, which includes the repeater customized control signal, to the wireless terminal 30 over the wireless access link 34.

In conjunction with aspect 2-5 and aspect 2-6, FIG. 2 further illustrates a simplified, representative customized frame C. The frame C is said to be "customized" in that frame C differs from the modified frame M. For example, the customized frame C differs from modified frame M by carrying the repeater customized control signal. The modified frame C may also have the default control signals removed therefrom or set a zero power. FIG. 2 shows the customized frame C with the radio set of resources 36 which were previously used, e.g., in the modified frame M, for the default signals as now having contents "0000", representing zero power for those radio resources. Further, FIG. 2 shows customized frame C with the radio set of resources 38 which were formatted or prepared by parent node 22 to be available for repeater customized control signal as now carrying the repeater customized control signal, as represented by contents "CCCC".

The person skilled in the art understands that the depictions of the example modified frame M and the example customized frame C are simplified depictions, and as such that the sizes and contents of the sets 36 and 38 relative to the entire frame are only for sake of illustration and are not to scale nor exact content.

As mentioned above, aspect 2-7 represents potential usage of the repeater customized control signal in a beamforming operation which may be performed between the repeater node 28 and the wireless terminal 30. The person skilled in the art understands that the repeater customized control signal, such as the example repeater customized control signals described herein, are employed in a beamforming operation.

Not all aspects described above need be performed in some example embodiments and modes, and indeed that each aspect has its own independent technological significance without being in combination with any other aspect. For example, in some example embodiments and modes the capabilities of repeater node 28 need not be announced as in aspect 2-1, since the capabilities may be previously understood or configured at parent node 22. Similarly, concerning aspect 2-3, the radio resources which are available and eligible for carrying the repeater customized control signal may also be configured at both parent node 22 and repeater node 28 and in such case need not be communicated. As a further example, the repeater customized control signal transmitted from repeater node 28 to wireless terminal 30 in aspect 2-6 need not necessarily be employed in a beamforming operation such as depicted by aspect 2-7.

Figure 3:
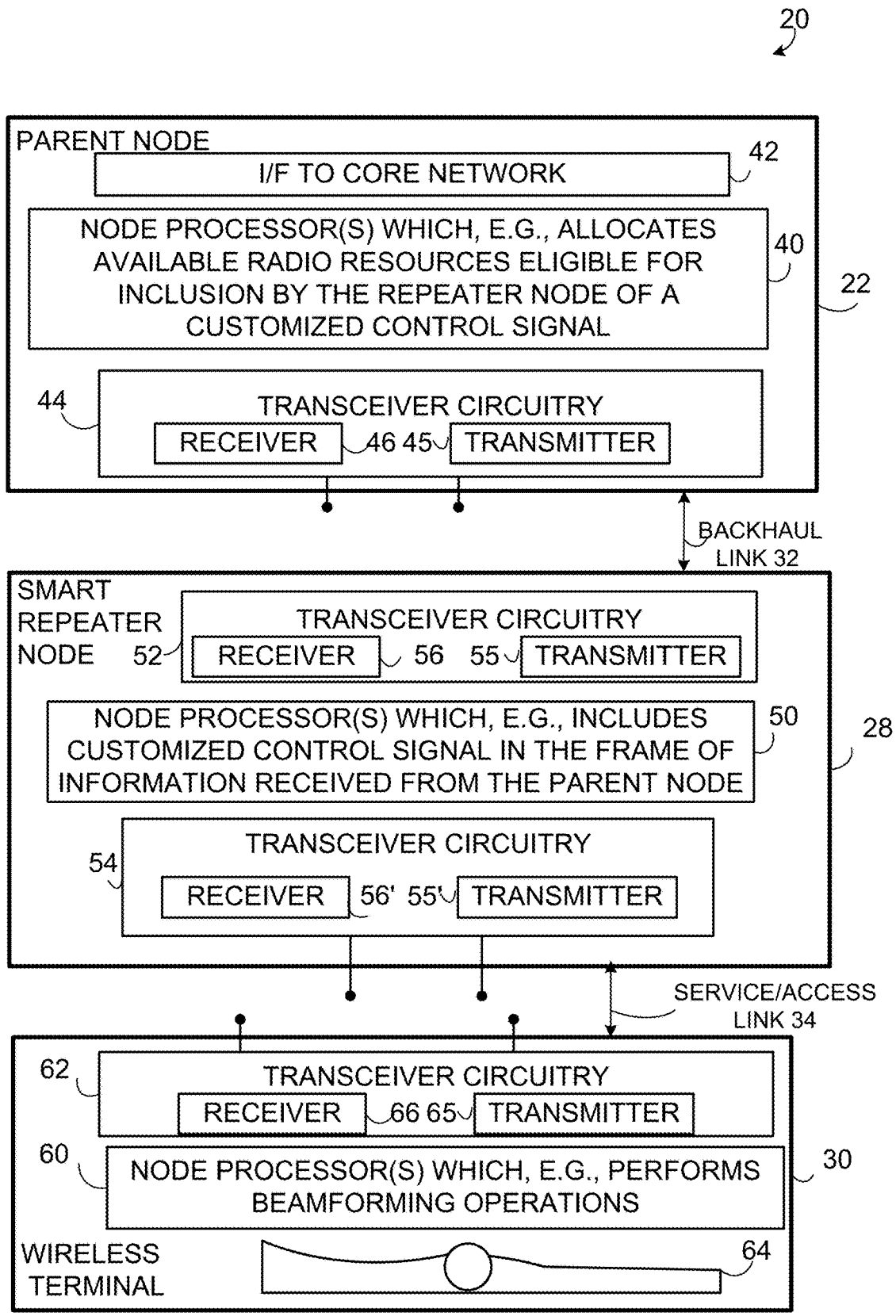
FIG. 3 is a schematic view illustrating generic structure of a parent node, a smart repeater node, and a wireless terminal according to an example embodiment and mode such as that of FIG. 2.

FIG. 3 illustrates example generic structure of the parent node 22, repeater node 28, and wireless terminal 30 of the telecommunications system 20 of FIG. 2. FIG. 3 illustrates the parent node 22 as comprising parent node processor(s) 40; parent node interface 42 to core networks; and parent node transceiver 44 for communication over wireless backhaul link 32. In the case that the parent node 22 is directly connected or communicates with the core network, the access node interface 42 to core networks is directly connected to the core network. In the case that the parent node 22 connects through another node to the core network, the access node interface 42 connects through such other node to the core networks. The parent node processor(s) 40 serves, e.g., in conjunction with aspect 2-2, to allocate, to the repeater node, available radio resources which are eligible for inclusion by the repeater node of a customized control signal, the customized control signal being customized for the repeater node. The parent node processor(s) 40 may also serve, e.g., in conjunction with aspect 2-3, to generate a message which informs the repeater node of the available radio resources. Parent node processor(s) 40 performs many other functions involved with operation of a parent node as understood to the person skilled in the art. The parent node transceiver 44 may comprise parent node transmitter circuitry 45, also known as a parent node transmitter 45, and parent node receiver circuitry 46, also known as parent node receiver 46. The parent node transmitter 45 serves, e.g., in conjunction with aspect 2-4, to transmit to the repeater node the frame of information which includes the available radio resources, e.g., the frame M, as well as to transmit the message which informs the repeater node of the available radio resources.

FIG. 3 further illustrates that repeater node 28 may comprise repeater node processor(s) 50; repeater node transceiver circuitry 52 which serves as an interface to parent node 22 and communication over wireless backhaul link 32; and repeater node transceiver circuitry 54 which serves as an interface to wireless terminal 30 and communication over wireless access link 34. The repeater node transceiver circuitry 52 and repeater node transceiver circuitry 54 may be separate circuits which are dedicated to communication over the wireless backhaul link 32 and wireless access link 34, respectively, or may be same circuits which serve for transmitting and receiving over both wireless backhaul link 32 and wireless access link 34 but in accordance with the timing and radio resources allocations of the respective links. For sake of example representation, repeater node transceiver circuitry 52 and repeater node transceiver circuitry 54 are shown as separate circuits. As such repeater node transceiver circuitry 52 may comprise repeater node wireless backhaul link transmitter circuitry 55, also known as parent node wireless backhaul link transmitter 55, and repeater node 34 wireless backhaul link receiver circuitry 56, also known as repeater node wireless backhaul link receiver 56. Repeater node transceiver 56 may serve, e.g., in conjunction with aspect 2-4, to receive over wireless backhaul link 32 a frame of information from the parent node, e.g., frame M. Repeater node transceiver 56 may also serve, e.g., in conjunction with aspect 2-3, to receive over wireless backhaul link 32 the message which advises repeater node 28 of the available radio resources which are eligible for carrying the repeater's customized control signal. Repeater node transceiver circuit 54 may comprise repeater node wireless access link transmitter circuitry 55', also known as repeater node wireless access link transmitter, and repeater node wireless access link receiver circuitry 56', also known as repeater node wireless access link receiver 56'. Repeater node transmitter 55' may serve, e.g., in conjunction with aspect 2-6, to transmit the frame of information which includes the customized control signal, e.g., frame C, over the wireless access link 34, e.g., to the wireless terminal 30.

The repeater node processor(s) 50 may serve, e.g., in conjunction with aspect 2-5, to include a customized control signal in the frame of information received from the parent node, the customized control signal being customized for the repeater node. Repeater node processor(s) 50 performs many other functions involved with operation of a repeater node as understood to the person skilled in the art.

FIG. 3 further illustrates that wireless terminal 30 comprises wireless terminal node processor(s) 60; wireless terminal transceiver circuitry 62; and wireless terminal interfaces 64. The wireless terminal transceiver circuitry 62 may comprise wireless terminal transmitter circuitry 65, also known as wireless terminal transmitter 65, and wireless terminal receiver circuitry 66, also known as wireless terminal receiver 66. The wireless terminal receiver 66 may serve, e.g., in conjunction with aspect 2-6, to receive, over wireless access link 34 from repeater node 28, the customized frame C. The wireless terminal transceiver circuitry 62 may serve to receive and transmit other information and signals over wireless access link 34. Such interfaces 64 may serve for both user input and output operations, and may comprise (for example) a screen such as a touch screen that can both display information to the user and receive information entered by the user. The interfaces 58 may also include other types of devices, such as a speaker, a microphone, or a haptic feedback device, for example.

The wireless terminal node processor(s) 60 may serve, e.g., to obtain the customized control signal from the customized frame C and to use the repeater customized control signal for various operations, including the beamforming procedures of aspect 2-7. The wireless terminal node processor(s) 60 performs many other functions involved with operation of a wireless terminal as understood to the person skilled in the art.

The transceiver circuits such as parent node transceiver 44, repeater node transceiver circuitry 52, repeater node transceiver circuitry 54, and wireless terminal transceiver circuitry 62 include antenna(e) for the wireless transmission. The transmitter circuits, such as parent node transmitter circuit 45, repeater node transmitter circuit 55, and wireless terminal transmitter circuit 65, may include, e.g., amplifier(s), modulation circuitry and other conventional transmission equipment. The receiver circuits, such as parent node receiver circuit 46, repeater node receiver circuit 56, and wireless terminal receiver circuit 66 may comprise, e.g., amplifiers, demodulation circuitry, and other conventional receiver equipment. For simplicity the details of the parent node transceiver 44, repeater node transceiver circuitry 52, repeater node transceiver circuitry 54, and wireless terminal transceiver circuitry 62 may not be fully illustrated in FIG. 4 and FIG. 5 but are understood from the description of FIG. 3.

Figure 4:
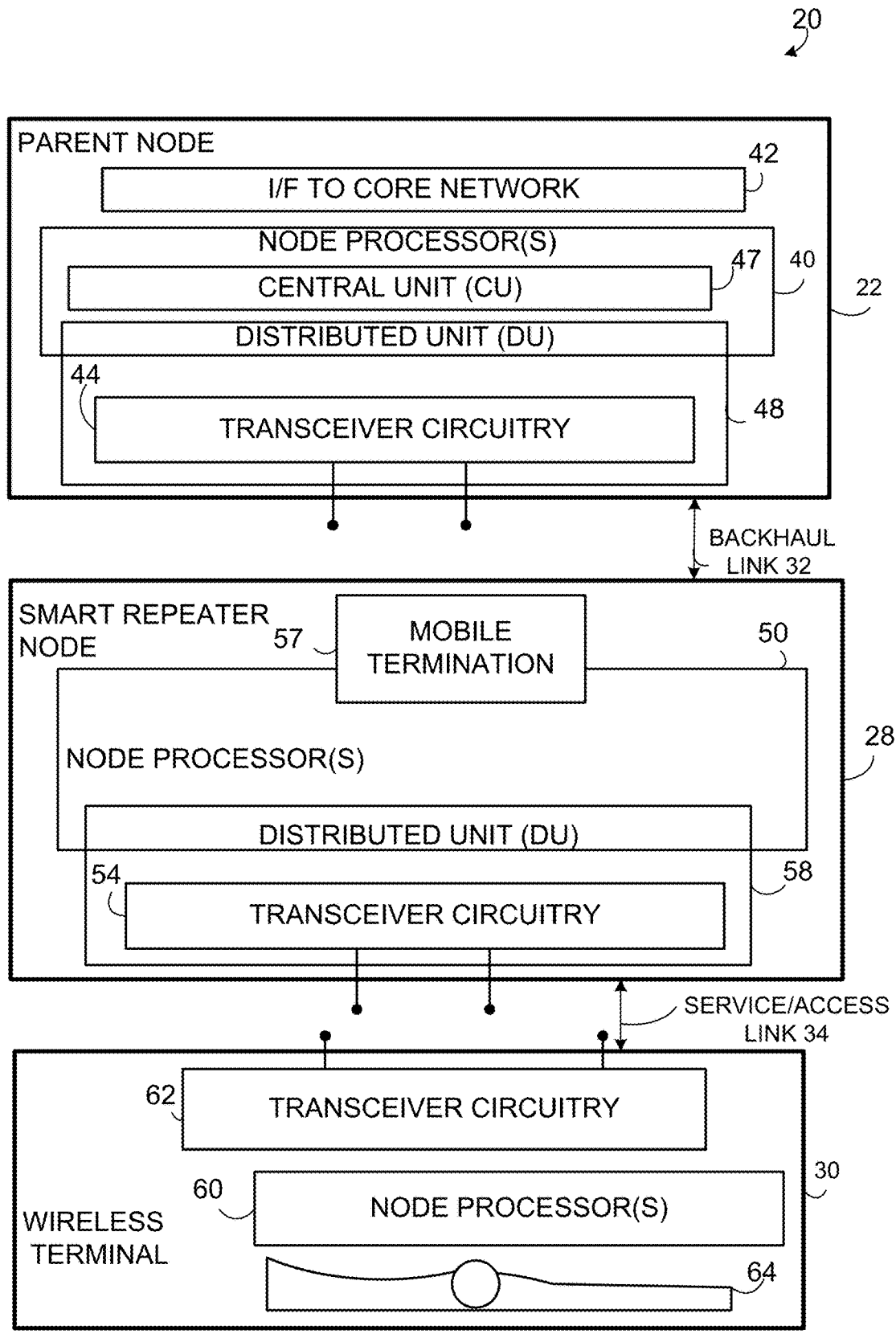
FIG. 4 is a schematic view illustrating, e.g., how example generic structure of the parent node and repeater node of the generic example embodiment and mode of FIG. 3 may be implemented according to a distributed architecture.

FIG. 4 illustrates how example generic structure of the parent node 22 and repeater node 28 of the generic example embodiment and mode of FIG. 3 may be implemented according to a distributed architecture. For example, FIG. 4 illustrates parent node 22 as comprising parent node central unit 46 and parent node distributed unit 48. The central unit 46 and distributed unit 48 may be realized by, e.g., be comprised of or include, one or more processor circuits, e.g., parent node processor(s) 40. The one or more parent node processor(s) 40 may be shared by parent node central unit 46 and repeater node 28, or each of central unit 46 and distributed unit 48 may comprise one or more parent node processor(s) 40. Moreover, parent node central unit 46 and parent node distributed unit 48 may be co-located at a same node site, or alternatively one or more distributed units 48 may be located at sites remote from central unit 46 and connected thereto by a packet network. The distributed unit 48 may comprise transceiver circuitry 46 which, as described herein, may in turn comprise transmitter circuitry and receiver circuitry.

FIG. 4 also illustrates repeater node 28 as comprising, in addition to repeater node processor(s) 50, repeater node mobile termination 56 and repeater node distributed unit 58. In the implementation of FIG. 4, the repeater node mobile termination 56 serves as the repeater node transceiver circuitry 52 and repeater node distributed unit 58 serves as repeater node transceiver circuitry 54. FIG. 4 further illustrates that repeater node processor(s) 50 may comprise or form part of one or more of repeater node mobile termination 56 and repeater node distributed unit 58.

The following information concerning distributed architecture, taken at least in part from TS38.401, is provided conjunction with the implementation of FIG. 4:

gNB Central Unit (gNB-CU, AKA CU): a logical node hosting RRC [Radio Resource Control], SDAP and PDCP protocols of the gNB or RRC and PDCP protocols of the en-gNB that controls the operation of one or more gNB-DUs. The gNB-CU terminates the F1 interface connected with the gNB-DU.

gNB Distributed Unit (gNB-DU, AKA DU): a logical node hosting RLC, MAC and PHY layers of the gNB or en-gNB, and its operation is partly controlled by gNB-CU.

One gNB-DU supports one or multiple cells. One cell is supported by only one gNB-DU. The gNB-DU terminates the F1 interface connected with the gNB-CU.

gNB-CU-Control Plane (gNB-CU-CP, AKA CU-C): a logical node hosting the RRC and the control plane part of the PDCP protocol of the gNB-CU for an en-gNB or a gNB. The gNB-CU-CP terminates the E1 interface connected with the gNB-CU-UP and the F1-C interface connected with the gNB-DU.

gNB-CU-User Plane (gNB-CU-UP, AKA CU-U): a logical node hosting the user plane part of the PDCP protocol of the gNB-CU for an en-gNB, and the user plane part of the PDCP protocol and the SDAP protocol of the gNB-CU for a gNB. The gNB-CU-UP terminates the E1 interface connected with the gNB-CU-CP and the F1-U interface connected with the gNB-DU.

NG-RAN node: as defined in TS 38.300.

PDU Session Resource: This term is used for specification of NG, Xn, and E1 interfaces. It denotes NG-RAN interface and radio resources provided to support a PDU Session.

In addition, as TS 38.300 points out: The Mobile-Termination (MT) function has been defined as a component of the Mobile Equipment. In the context of this study, MT is referred to as a function residing on an IAB-node that terminates the radio interface layers of the backhaul Uu interface toward the IAB-donor or other IAB-nodes.

Figure 5:
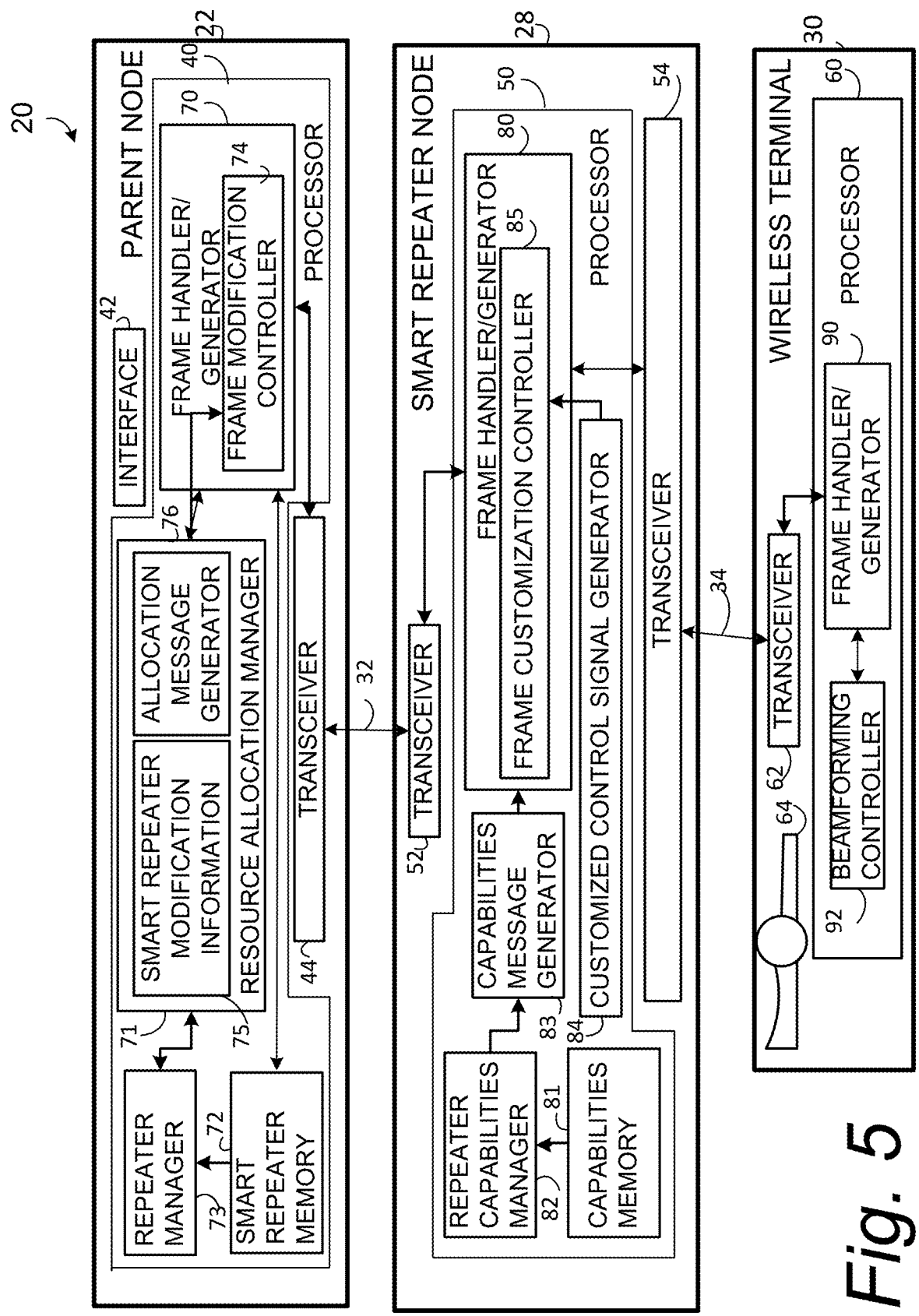
FIG. 5 is a schematic view illustrating in more detail example components and functionalities of a parent node, a smart repeater node, and a wireless terminal according to an example, non-exhaustive, implementation of the telecommunications system of FIG. 2, FIG. 3, and/or FIG. 4.

FIG. 5 is a schematic view illustrating in more detail example components and functionalities of a parent node, a smart repeater node, and a wireless terminal according to an example, non-exhaustive, implementation of one or both of telecommunication systems of FIG. 3 and FIG. 4. FIG. 5 particularly shows example constituent units or functionalities of the parent node processor(s) 40 of parent node 22; of the repeater node processor(s) 50 of repeater node 28; and of the wireless terminal node processor(s) 60 of wireless terminal 30. Each of such constituent units or functionalities may be realized by processor circuits or other circuits which accomplish the stated functionality and may be either shared with other functionalities or dedicated to the stated functionality.

For example, FIG. 5 shows parent node processor(s) 40 as comprising parent node frame handler/generator 70; resource allocation manager 71; smart repeater memory 72; and repeater manager 73. The parent node frame handler/generator 70 in turn comprises frame modification controller 74. The smart repeater memory 72 in turn comprises smart repeater modification information 75 and allocation message generator 76. In the example implementation of FIG. 5, the smart repeater memory 72 serves as a directory or database for the repeater nodes under control or in communication with parent node 22, and for each repeater node such as repeater node 28 stores the repeater node capabilities information that may be obtained from the repeater node during aspect 2-1. In this regard, information received in any repeater node capabilities message generated by repeater node 28, which may indicate that repeater node 28 is configured to include a repeater customized control signal in the frame of information received from the parent node, may be stored in smart repeater memory 72. The repeater manager 73 supervises the one or more repeater nodes that may be under control or in communication with parent node 22 and operates in conjunction with resource allocation manager 71. In conjunction with aspect 2-1, smart repeater modification information 75 of resource allocation manager 71 is configured to store or generate information which indicates which radio resources of a frame may be allocated as the available radio resources which are eligible for inclusion of a customized control signal by the repeater node, such as radio resources of set 38 of frame M of FIG. 2. The allocation message generator 76 serves to generate a message which informs the repeater node of the available radio resources, in conjunction with aspect 2-3. Such allocation message as generated by allocation message generator 76 is included in a frame by parent node frame handler/generator 70 and transmitted to repeater node 28 by parent node transceiver 44. Such message may be either in the frame in which the allocated radio resources also are included, or in advance of such frame. The smart repeater modification information 75 of resource allocation manager 71 is used by frame modification controller 74 to enable parent node frame handler/generator 70 to generate the frame which comprises the allocated radio resources eligible for inclusion of a customized control signal by the repeater node, e.g., the modified frame M. The modified frame M is transmitted to repeater node 28 over the wireless backhaul link 32 by parent node transceiver 44 in conjunction with aspect 2-4.

FIG. 5 further shows repeater node 28 as comprising repeater node frame handler/generator 80; repeater node capabilities memory 81; repeater node capabilities manager 82; repeater node capabilities message generator 83; and repeater node customized control signal generator 84. The repeater node frame handler/generator 80 in turn comprises frame customization controller 85. The repeater node capabilities memory 81 stores information concerning the capabilities of the repeater node 28, including the fact/an indication that repeater node 28 is a "smart" repeater node in a sense, for example, that the repeater node 28 is capable of inserting repeater customized control signal into a frame for transmission on wireless access link 34. The information in repeater node capabilities memory 81 may be preconfigured, e.g., by direct input into repeater node 28, or may be configured by download from another node. The repeater node capabilities manager 82 supervises operation of repeater node 28, including requesting that repeater node capabilities message generator 83 generate the repeater node capabilities message of aspect 2-1. The repeater node customized control signal generator 84 determines what value(s) should be utilized or set for the repeater customized control signal. As understood by the person skilled in the art, such value(s) for the repeater customized control signal may and usually does depend on beamforming operations performed between the repeater node 28 and a wireless terminal such as wireless terminal 30. Upon determination of values for the repeater customized control signal by repeater node customized control signal generator 84, the frame customization controller 85 "customizes" the frame to be sent on wireless access link 34 using the repeater customized control signal, as indicated herein, for example in conjunction with aspect 2-5. The repeater node transceiver circuitry 54 then sends the customized frame C, over wireless access link 34, to wireless terminal 30 in conjunction with aspect 2-6.

FIG. 5 further shows wireless terminal 30 as comprising wireless terminal frame handler/generator 90 and beamforming controller 92. The wireless terminal transceiver circuitry 62 receives the customized frame C in conjunction with aspect 6-0 in a frame handled by wireless terminal frame handler/generator 90. The wireless terminal 30 then obtains the repeater customized control signal, so that beamforming controller 92 may use the repeater customized control signal for the beamforming procedure(s) of aspect 2-7.

The transceiver circuits and distributed units of FIG. 4 and FIG. 5 may include transmitter circuits and receiver circuits such as illustrated in FIG. 3.

Figure 6:
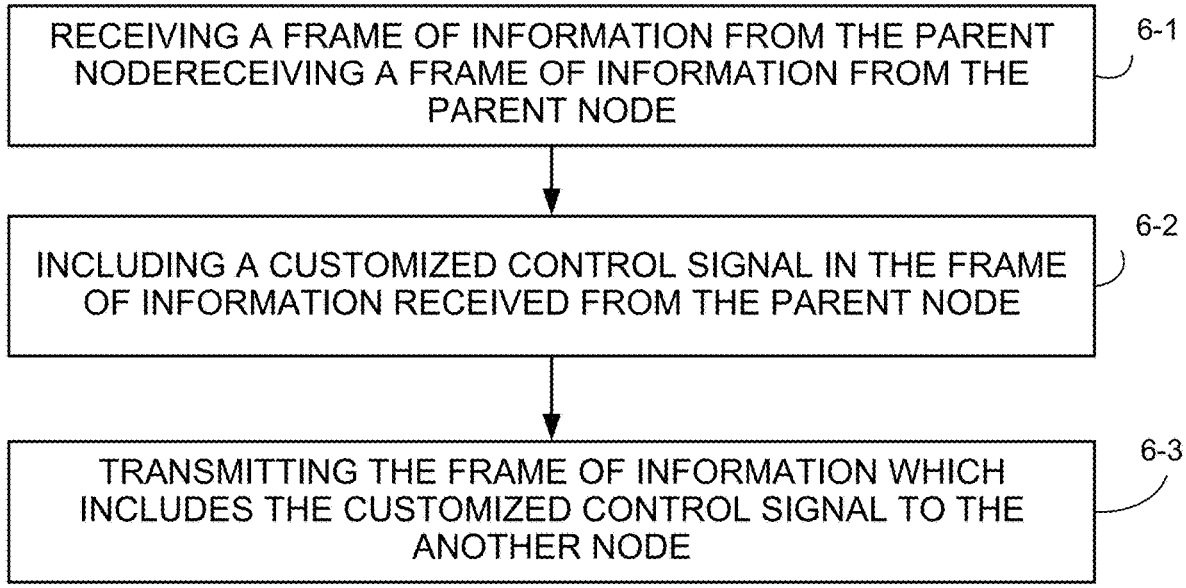
FIG. 6 is a flowchart showing example, non-limiting, basic acts or steps that may be performed by a repeater node of the example embodiments and modes of one or more of FIG. 2, FIG. 3, FIG. 4, and FIG. 5.

FIG. 6 is a flowchart showing example, non-limiting, basic acts or steps that may be performed by a repeater node of the example embodiments and modes of one or more of FIG. 2, FIG. 3, FIG. 4, and FIG. 5. Act 6-1 comprises receiving a frame of information from the parent node. The received frame may be a frame such as frame M described above in conjunction with aspect 2-4. Act 6-2 comprises including a customized control signal in the frame of information received from the parent node. As mentioned above, the customized control signal is customized for the repeater node. The inclusion of the repeater customized control signal of act R-2 may be in conjunction with aspect 2-5, and may result in the customized frame C, as depicted in FIG. 2. Act 6-3 comprises transmitting the frame of information which includes the customized control signal to another node, such as the wireless terminal 30. Act R-3 may be performed in conjunction with aspect 2-6.

Figure 7:
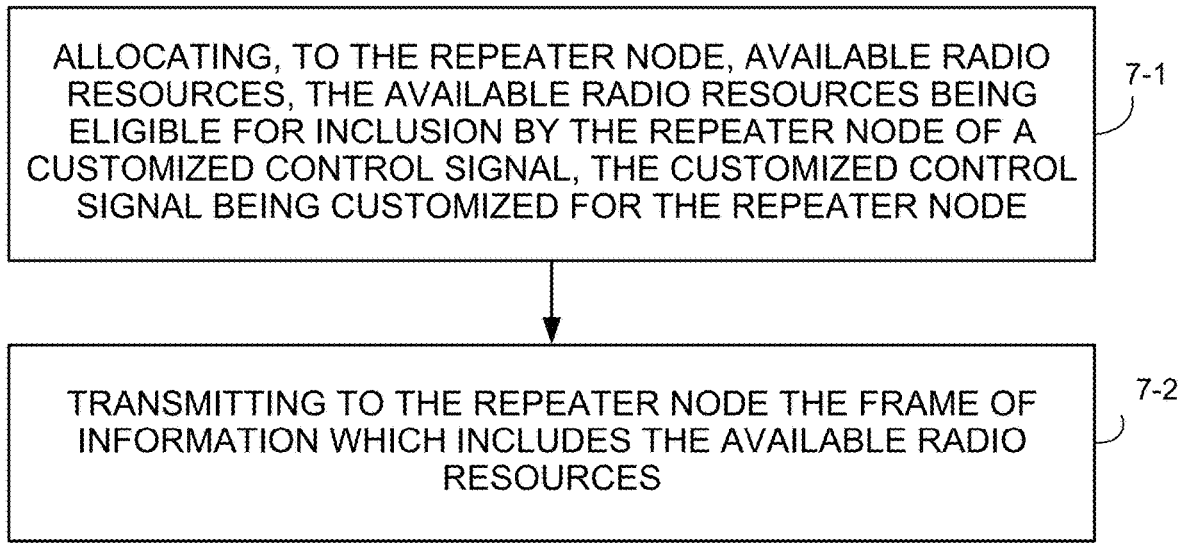
FIG. 7 is a flowchart showing example, non-limiting, basic acts or steps that may be performed by a parent node of the example embodiments and modes of one or more of FIG. 2, FIG. 3, FIG. 4, and FIG. 5.

FIG. 7 is a flowchart showing example, non-limiting, basic acts or steps that may be performed by a parent node of the example embodiments and modes of one or more of FIG. 2, FIG. 3, FIG. 4, and FIG. 5. Act 7-1 comprises allocating, to the repeater node, available radio resources. As indicated above, the available radio resources are those eligible for inclusion by the repeater node of a customized control signal, the customized control signal being customized for the repeater node. Such allocation may be represented by aspect 2-1. Act 7-2 comprises transmitting, to the repeater node, the frame of information which includes the available radio resources. The frame transmitted by act 7-2 may be the modified frame M described in conjunction with aspect 2-4.

Figure 8:
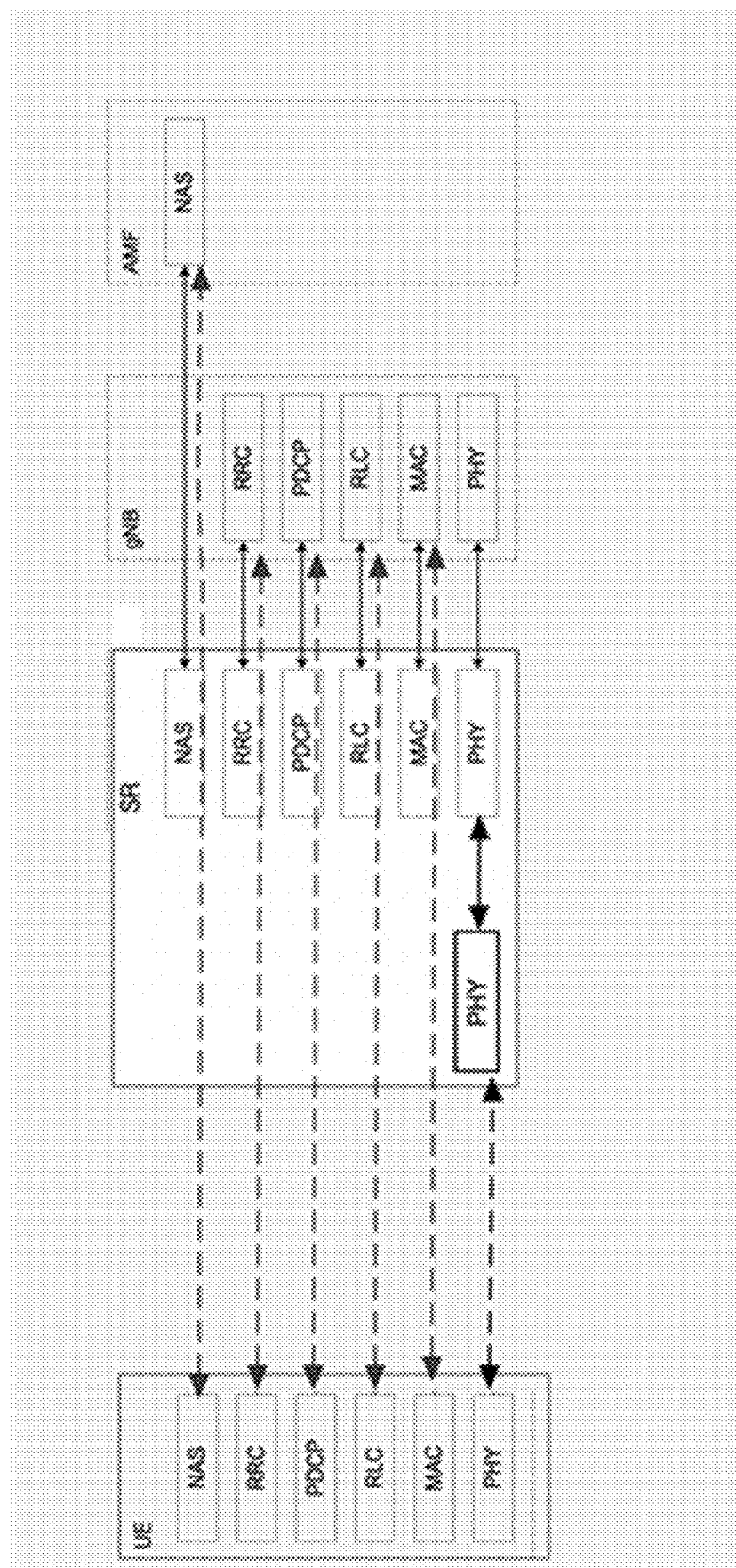
FIG. 8 is a diagrammatic view illustrating a protocol stack of the control planes of a repeater node, a wireless terminal, and a parent node for the technology described herein.

The smart repeater (SR) or NCR such as repeater node 28 according to the technology described herein could be a stripped down IAB node, in order to maintain transparency to the UEs served by the service link or access link, the link from the repeater to the UEs, as opposed to the link from the repeater to the gNB or IAB node, which is the backhaul link. To simplify the ensuing discussion, it is assumed that the repeater node's backhaul link is a gNB; hence the protocol stack of the control planes of the repeater node, a UE served, and gNB would appear as in FIG. 8.

In this manner the downlink beamforming and multiplexing of the smart repeater link would be configured by the RRC, Radio Resource Control, from the parent node 22 or gNB, terminating in the Mobile Termination portion of the smart repeater 28 of the example embodiment and mode of FIG. 4.

Figure 9:
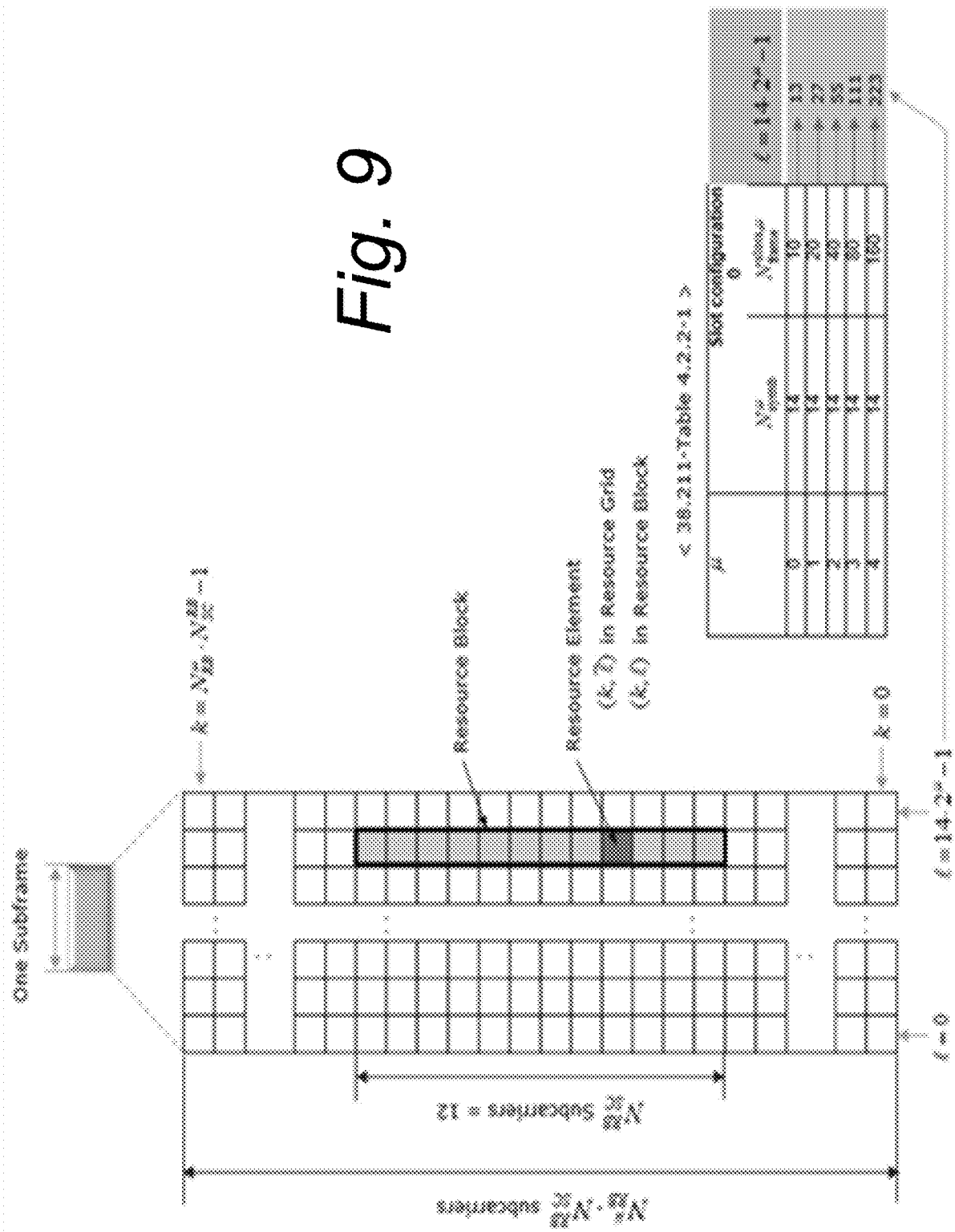
FIG. 9 is a diagrammatic view illustrating a resource grid which may form the basis of the frames described herein and for New Radio as described by 3GPP TS38.211 v16.7.0.

A resource grid which may form the basis of the frames described herein may be described by 3GPP TS38.211 v16.7.0 and illustrated in FIG. 9, in which the following definitions and symbols apply:

$N_{sc}^{RB}$ Number of subcarriers per resource block, see clause 4.4.4.1

$N_{slot}^{subframe,\mu}$ Number of slots per subframe for subcarrier spacing configuration see clause 4.3.

In FIG. 3, $N_{frame}^{slots\ \mu}$ is the number of slots per radio frame; and one subframe is one half of a radio frame.

According to an aspect of the technology described herein, reference signals, RSs, and in particular channel state information, CSI, reference signals, inhabit known, configured, time frequency regions of the OFDM resource grid. For example, the reference signals CSI RSs may inhabit a set of non-contiguous resource elements, and therefore a known set of OFDM subcarriers, regardless of the carrier numerology.

To maintain both transparency to the UEs on the SR/NCR's service link, to emulate performance characteristics of base stations, as well as to realize flexibility in deployment however, the technology described herein allows for non-information bearing signals, e.g., reference signals, synchronization signals, as well as the Physical Broadcast Channel, PBCH, to be generated locally by the SR/NCR, e.g., by repeater node 28. The contents of PBCH, particularly the Master Information Block with System Information Block 1 (SIB1) is locally generated and is essentially identical to that broadcast by the parent node 20, but in a customized frame transmitted by the repeater node 28 to the wireless terminal occupies different time/frequency resources than in a modified frame configured by the parent node 20 and transmitted by the parent node 20 to the repeater node 28. A side benefit of that capability is that interference with the base station may be minimized, e.g., so that resources used for the repeater customized control signal are chosen to avoid interference with node(s) such as parent node 22.

To do this local generation by the repeater node 28, the received non-information bearing signals is preferably removed. In addition, in accordance with one example embodiment and mode, to minimize interference, the technology described herein may not only remove the non-user data information bearing signals, but also regenerates the entire Signal Synchronization Block (SSB), including the broadcast channel, using different time resources than that transmitted from the base station.

Figure 10:
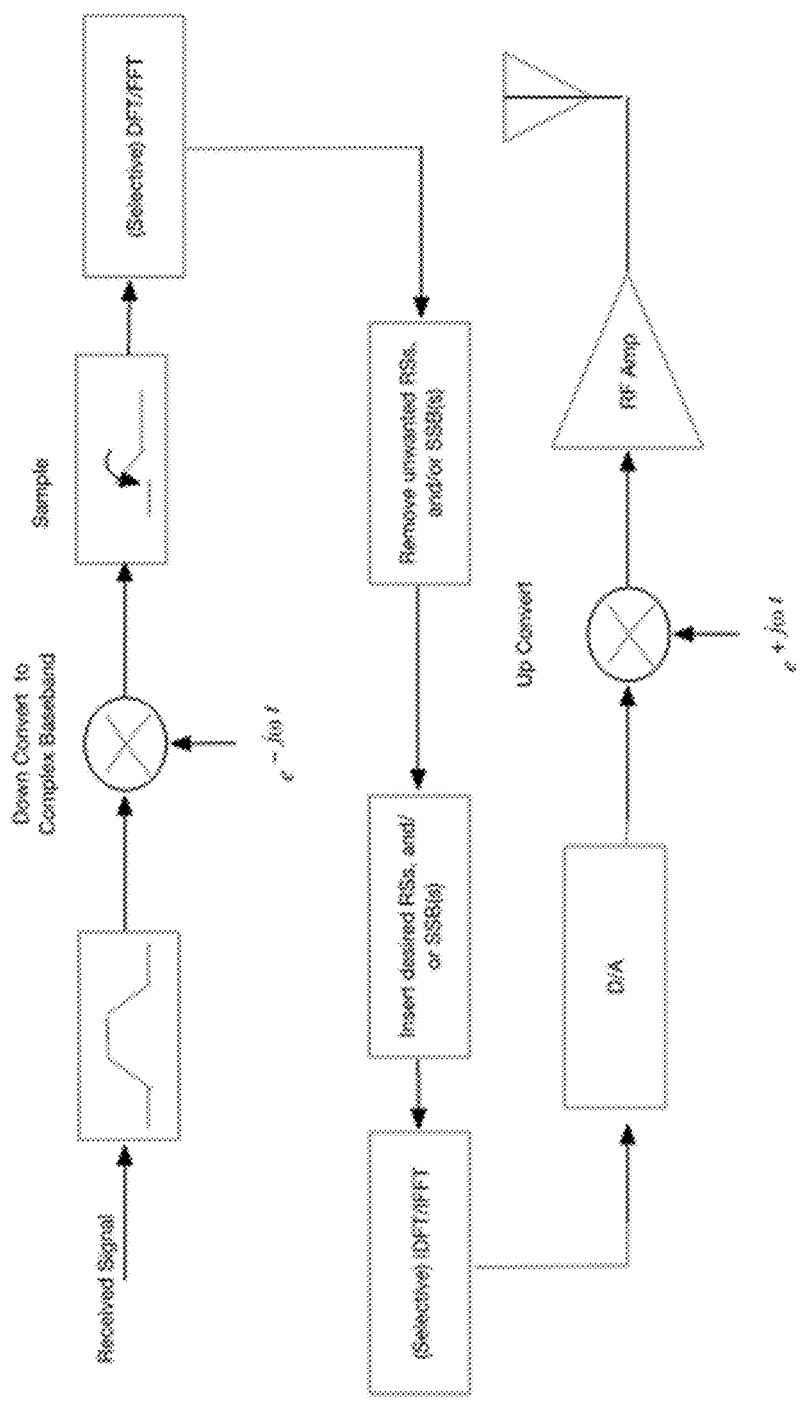
FIG. 10 is a simplified schematic view of functionalities that may be employed by a smart repeater node to extract control signals and replace the control signals with repeater customized control signal.

The process described for removing reference signals mentioned above may be prescribed or configured by the gNB, e.g., by parent node 22, and may be performed by the repeater node processor(s) 50 in a manner such as illustrated in FIG. 10. FIG. 10 is a simplified description of how repeater node processor(s) 50, frame customization controller 85 in particular, may extract and replace CSI RSs, and by extension SSBs to generate the customized frame C. A complete inverse DFT, or FFT, need not be performed by repeater node 28, but only those carriers that contain what is wished to be configured need be extracted and replaced. To denote such the designation (Selective) DFT/FFT is employed since an entire DFT/FFT need not be done for the entire relevant resource grid.

To facilitate the behavior of repeater node 28 and its insertion of repeater customized control signal, the Donor Node or parent node 22 may transmit time/frequency regions according to the NR frequency grid in which there may be zero power for the reference, synchronization, and/or channel state information signals as well as a zero power region, e.g., a region of zero power level transmission, into which the repeater node 28 may supply a broadcast channel(s) for the access link 34. For this purpose, in simplified fashion FIG. 2 shows the set 38 of radio resources for frame M with zero elements, e.g., to reflect zero power transmission for those radio resources.

In conjunction with aspect 2-3 of FIG. 2, one example way to establish, and/or (re)configure the relationship between parent node 22 and repeater node 28 may involve a re-use or re-purposing of the information element ServingCellConfigCommon, which is commonly used for handover via RRC Reconfiguration with Sync. The information element ServingCellConfigCommon contains enough elements to describe a cell to wireless terminal 30 so that a UE may quickly, efficiently, and reliably connect to it, hand over to it, and so forth. The information elements for describing a cell to the wireless terminal include, for example, in the event of a handover, the Physical Layer parameters needed for the wireless terminal to communicate to another cell. Mutatis mutandis for recovering from link failure, beam failure, or RRC Reconfiguration events besides handover. In similar fashion, a repeater node, an NCR, needs information about how it will appear to a wireless terminal to which it will be repeating and essentially serving as a gNB.

In an example embodiment and mode, the repeater node 28 essentially receives the entirety of the bandwidth part, BWP, of the downlink, DL, signal, and becomes synchronized to it, in RRC CONNECTED mode. Based on the configuration given by the relationship established by aspect 2-3, in conjunction with aspect 2-5 of FIG. 2 the repeater node 28 determines which time/frequency resources should be replaced, e.g., SSB(s), and/or RSs, removes those unwanted RSs and/or SSB(s), reconstitutes the DL signal as the customized frame C, and repeats, e.g., transmits the DL signal as the customized frame C to wireless terminal 30. Thus far this has been described in the discrete time domain, but the person skilled in the art understands that there are analog methods of achieving this as well. In addition, if, for example SSB transmission is desired by configuration to be at some other point in time, this can be done via delay lines, possibly through timing advance mechanisms. Such delay need not be done for delay sensitive traffic, but for traffic that is not delay sensitive, e.g., web browsing.

In addition, and without conversion to the discrete time domain, the Bandwidth Parts (BWPs) of the cell as presented to the UEs served by the NCR may also be altered via the configuration by using up or down conversion strictly as an analog realization controlled by configuration As mentioned above, in some example embodiments and modes, the downlink from the parent node 22 is transmitted with zero power time/space regions in which the repeater node 28 may use transmission of Signal Synchronization Blocks (SSBs) for the access link or service link. Furthermore, such embodiments, particularly those to be deployed in bands above 24 GHz, e.g., within Frequency Region 2, also known as "FR2" and therefore constrained to use Time Division Duplex communication, may be configured using an information element like tdd-UL-DL-ConfigurationCommon, which is described in 3GPP TS38.213 v16.7.0 Physical layer procedures for control, e.g., Clause 11 and 11.1ff, which is incorporated by reference. This configuration indicates a slot format to be used for uplink, for downlink, and flexible slots to allow for, on the backhaul link, slots to be configured as flexible to allow for assignment of the SSBs within those slots via configuration. The slot format is indicated as a slot format indicator (SFI) as per table 11.1.1-1 of 3GPP TS38.213 v16.7.0.

In some example embodiments and modes, an information element like tdd-UL-DL-ConfigurationCommon, but which is referred to herein as tdd-UL-DL-Configuration-Dedicated-IAB-MT may, despite the similarity to tdd-UL-DL-ConfigurationCommon, be dedicated to a single SR/NCR. Using such dedicated information elements may cater to employment of a plurality of SR/NCRs which may have different uplink/downlink configurations on the backhaul link, which can be realized due to the fact that it is expected that the backhaul links will have very spatially narrow beam pairs. Furthermore, slot formats on the access link may be configured by an IE tdd-UL-DL-Configuration-Common, which may be different from that configured on the backhaul link or may be configured as a subset from the IE "like tdd-UL-DL-ConfigurationCommon" on the backhaul link. In like manner, an NCR may be provided with an IE "like slotFormatCombinationsPerCell," or to indicate a plurality of slot formats to be configured for the SR/NCR. Configured slot formats on the access link per cell would be able to be changed via reconfiguration, if tdd-UL-DL-ConfigurationCommon, or tdd-UL-DL-ConfigurationDedicated-IAB-MT are configured.

In the above regard, see 3GPP TS38.213 v16.7.0 clause 14, a portion of which is excerpted as follows:

An IAB-MT can be provided, by SlotFormatCombinationsPerCell, a list of slot format combinations applicable for one serving cell and, by SlotFormatIndicator, a configuration for monitor a DCI format 2_0 indicating a slot format combination, from the list of slot format combinations, over a number of slots as described in clause 11.1.1. In addition to the slot formats in Table 11.1.1-1, an SFI field for an IAB-MT in DCI format 2_0 can indicate to the IAB-MT a slot format from the slot formats in Table 14-2.

Thus if SlotFormatCombinationsPerCell is provided for the access link, the UL/DL configuration may be changed dynamically, via DCI, whereas if information element like tdd-UL-DL-ConfigurationCommon, or tdd-UL-DL-ConfigurationDedicated-IAB-MT may be changed by reconfiguration, as per the prior art.

As mentioned before, ServingCellConfigCommon, which is commonly used for handover via RRC Reconfiguration with Sync, may be used to describe the configuration of the cell served by the repeater node 28. ServingCellConfigCommon, described in Table 1, may include an information element "like tdd-UL-DL-ConfigurationCommon." As with other information elements in ServingCellConfigCommon, the information element "like tdd-UL-DL-Configuration-Common" would be cell-specific, and describe, for unpaired spectrum, the downlink-uplink periodicity, and the specific number of uplink and downlink slots and boundary OFDM symbols, as defined in TS38.331 v. 16.6.0, section 6.3.2. In addition, within that slot pattern, specific DL symbols allocated according to the SSB information elements in ServingCellConfigCommon would be used to determine where to place the SSBs.

In accordance with an aspect of the technology described herein, a network-controlled relay would look to a parent node 22 like a user equipment, UE, and would identify itself as a UE via capability information. Using the capability information supplied by the repeater node 28, the parent node 22 has sufficient information to identify a network-controlled relay, e.g., a smart repeater node, and therefore be able to (re)configure the network-controlled relay. Reconfiguration may be preferable over pre-configuration to allow for better use of time/frequency/space resources, which would include parameters related to uplink and downlink initial bandwidth parts inter alia.

TABLE 1

| ServingCellConfigCommon |
|---|

(excerpted from 3GPP TS 38.331 v. 16.6.0)
The IE ServingCellConfigCommon is used to configure cell specific parameters of a UE's serving cell. The IE contains parameters which a UE would typically acquire from SSB, MIB or SIBs when accessing the cell from IDLE. With this IE, the network provides this information in dedicated signalling when configuring a UE with a SCells or with an additional cell group (SCG). It also provides it for SpCells (MCG and SCG) upon reconfiguration with sync.

ServingCellConfigCommon information element:
-- ASN1START
-- TAG-SERVINGCELLCONFIGCOMMON-START
ServingCellConfigCommon ::=                    SEQUENCE {
   physCellId                                  PhysCellId
OPTIONAL, -- Cond HOAndServCellAdd,
   downlinkConfigCommon                        DownlinkConfigCommon
OPTIONAL, -- Cond HOAndServCellAdd
   uplinkConfigCommon                          UplinkConfigCommon
OPTIONAL, -- Need M
   supplementaryUplinkConfig                   UplinkConfigCommon
OPTIONAL, -- Need S
   n-TimingAdvanceOffset                       ENUMERATED
{ n0, n25600, n39936 }
OPTIONAL, -- Need S
   ssb-PositionsInBurst                        CHOICE {
     shortBitmap                               BIT STRING (SIZE
(4) ) ,
     mediumBitmap                              BIT STRING (SIZE
(8) ) ,
     longBitmap                                BIT STRING (SIZE
(64) )
   }
OPTIONAL, -- Cond AbsFreqSSB
   ssb-periodicityServingCell                  ENUMERATED { ms5, ms10,
ms20, ms40, ms80, ms160, spare2, spare1 }             OPTIONAL, -- Need S
   dmrs-TypeA-Position                         ENUMERATED {pos2, pos3},
   lte-CRS-ToMatchAround                       SetupRelease {
RateMatchPatternLTE-CRS }                             OPTIONAL,
-- Need M
   rateMatchPatternToAddModList                SEQUENCE (SIZE
(1. . maxNrofRateMatchPatterns) ) OF RateMatchPattern OPTIONAL,
-- Need N
   rateMatchPatternToReleaseList               SEQUENCE (SIZE
(1..maxNrofRateMatchPatterns)) OF RateMatchPatternId  OPTIONAL,
-- Need N
   ssbSubcarrierSpacing                        SubcarrierSpacing
OPTIONAL, -- Cond HOAndServCellWithSSB
   tdd-UL-DL-ConfigurationCommon               TDD-UL-DL-ConfigCommon
OPTIONAL, -- Cond TDD
   ss-PBCH-BlockPower                          INTEGER (-60..50),
   ...,
   [ [
   channelAccessMode-r16                       CHOICE {
     dynamic                                   NULL,
     semiStatic
SemiStaticChannelAccessConfig-r16
   }
OPTIONAL, -- Cond SharedSpectrum
   discoveryBurstWindowLength-r16              ENUMERATED
{ms0dot5, ms1, ms2, ms3, ms4, ms5}                    OPTIONAL,
-- Need R
   ssb-PositionQCL-r16                         SSB-PositionQCL-
Relation-r16                                          OPTIONAL, --
Cond SharedSpectrum
   highSpeedConfig-r16                         HighSpeedConfig-r16
OPTIONAL -- Need R
   ] ]
}
-- TAG-SERVINGCELLCONFIGCOMMON-STOP
-- ASN1STOP TABLE 1-continued ServingCellConfigCommon ServingCellConfigCommon field descriptions channelAccessMode
If present, this field indicates which channel access
procedures to apply for operation with shared spectrum
channel access as defined in TS 37.213 [48]. If the field
is configured as "semiStatic", the UE shall apply the
channel access procedures for semi-static channel occupancy
as described in subclause 4.3 in TS 37.213. If the field is
configured as "dynamic", the UE shall apply the channel
access procedures in TS 37.213, with the exception of
subclause 4.3 of TS 37.213.

dmrs-TypeA-Position
Position of (first) DM-RS for downlink (see TS 38.211 [16],
clause 7.4.1.1.1) and uplink (TS 38.211 [16], clause
6.4.1.1.3) .

downlinkConfigCommon
The common downlink configuration of the serving cell,
including the frequency information configuration and the
initial downlink BWP common configuration. The parameters
provided herein should match the parameters configured by
MIB and SIB1 (if provided) of the serving cell, with the
exception of controlResourceSetZero and searchSpaceZero
which can be configured in ServingCellConfigCommon even if
MIB indicates that they are absent.

discoveryBurstWindowLength
Indicates the window length of the discovery burst in ms
(see TS 37.213 [48]) .

longBitmap
Bitmap when maximum number of SS/PBCH blocks per half frame
equals to 64 as defined in TS 38.213 [13], clause 4.1.

lte-CRS-ToMatchAround
Parameters to determine an LTE CRS pattern that the UE
shall rate match around.

mediumBitmap
Bitmap when maximum number of SS/PBCH blocks per half frame
equals to 8 as defined in TS 38.213 [13], clause 4.1.

n-TimingAdvanceOffset
The N_TA-Offset to be applied for all uplink transmissions
on this serving cell. If the field is absent, the UE
applies the value defined for the duplex mode and frequency
range of this serving cell. See TS 38.133 [14], table
7.1.2-2.

rateMatchPatternToAddModList
Resources patterns which the UE should rate match PDSCH
around. The UE rate matches around the union of all
resources indicated in the rate match patterns. Rate match
patterns defined here on cell level apply only to PDSCH of
the same numerology (see TS 38.214 [19], clause 5.1.4,1).

shortBitmap
Bitmap when maximum number of SS/PBCH blocks per half frame
equals to 4 as defined in TS 38.213 [13], clause 4.1.

ss-PBCH-BlockPower
Average EPRE of the resources elements that carry secondary
synchronization signals in dBm that the NW used for SSB
transmission, see TS 38.213 [13], clause 7.

ssb-periodicityServingCell
The SSB periodicity in ms for the rate matching purpose. If
the field is absent, the UE applies the value ms5. (see TS
38.213 [13], clause 4.1)

ssb-PositionQCL
Indicates the QCL relation between SSB positions for this
serving cell as specified in TS 38.213 [13], clause 4.1.

ssb-PositionsInBurst
For operation in licensed spectrum, indicates the time
domain positions of the transmitted SS-blocks in a half
frame with SS/PBCH blocks as defined in TS 38.213 [13],
clause 4.1. The first/leftmost bit corresponds to SS/PBCH
block index 0, the second bit corresponds to SS/PBCH block
index 1, and so on. Value 0 in the bitmap indicates that
the corresponding SS/PBCH block is not transmitted while
value 1 indicates that the corresponding SS/PBCH block is
transmitted. The network configures the same pattern in
this field as in the corresponding field in
ServingCellConfigCommonSIB.
For operation with shared spectrum channel access, only
mediumBitmap is used and the UE assumes that one or more
SS/PBCH blocks indicated by ssb-PositionsInBurst may be TABLE 1-continued ServingCellConfigCommon transmitted within the discovery burst transmission window and have candidate SS/PBCH blocks indexes corresponding to SS/PBCH block indexes provided by ssb-PositionsInBurst (see TS 38.213 [13], clause 4.1). If the k-th bit of ssb-PositionsInBurst is set to 1, the UE assumes that one or more SS/PBCH blocks within the discovery burst transmission window with candidate SS/PBCH block indexes corresponding to SS/PBCH block index equal to k - 1 may be transmitted; if the kt-th bit is set to 0, the UE assumes that the corresponding SS/PBCH block (s) are not transmitted. The k-th bit is set to 0, where k > ssb-PositionQCL and the number of actually transmitted SS/PBCH blocks is not larger than the number of I's in the bitmap. The network configures the same pattern in this field as in the corresponding field in ServingCellConfigCommonSIB.
ssbSubcarrier Spacing
Subcarrier spacing of SSB. Only the values 15 kHz or 30 kHz (FR1), and 120 kHz or 240 kHz (FR2) are applicable.
supplementaryUplinkConfig
The network configures this field only if uplinkConfigCommon is configured. If this field is absent, the UE shall release the supplementaryUplinkConfig and the supplementaryUplink configured in ServingCellConfig of this serving cell, if configured.
tdd-UL-DL-ConfigurationCommon
A cell-specific TDD UL/DL configuration, see TS 38.213 [13], clause 11.1.

In accordance with other aspects of the technology described herein:

A smart repeater or SR may be a repeater with a UE interface to the backhaul link, and may be a physical layer, PHY, on the service link The service link may have CSI RSs generated at the repeater, configured by the CU's Radio Resource Control, RRC.

Beamforming on the service link from the repeater node 28 may be realized in a matter analogous to Transmission configuration Indication, TCI, but with the DL RSs, Beam Pairs, and so forth on the service link being configured by the CU of the parent node 22.

A Synchronization Signal Block, SSB, may be staggered in time on Service Link with respect to that on the backhaul link to prevent interference with the signal synchronization block of access node 22.

The various foregoing example embodiments and modes may be utilized in conjunction with one or more example embodiments and modes described herein.

Figure 11:
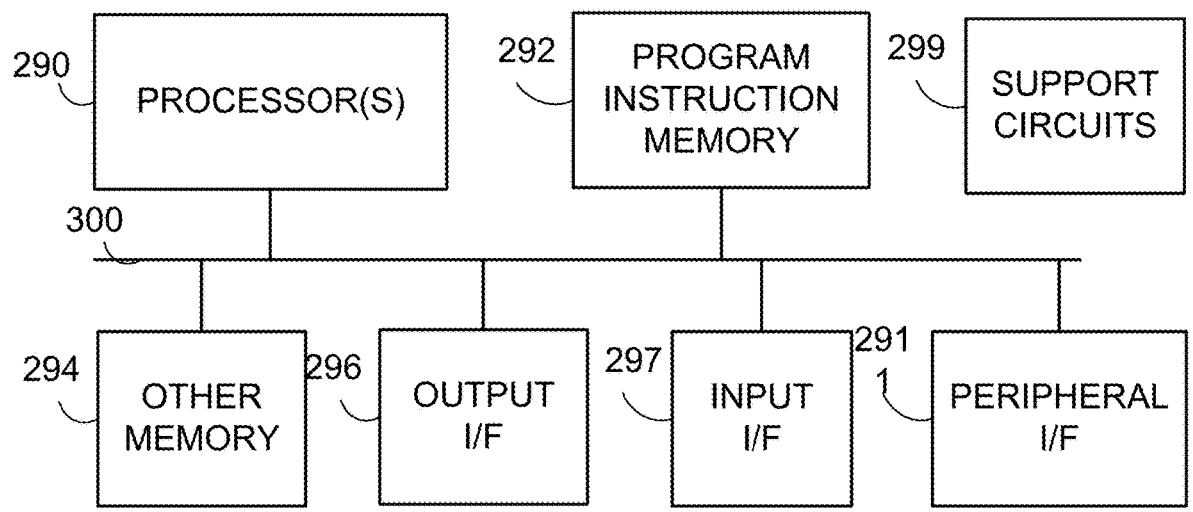
FIG. 11 is a diagrammatic view showing example elements comprising electronic machinery which may comprise a wireless terminal, a radio parent node, and a core network node according to an example embodiment and mode.

Certain units and functionalities of the systems 20 may be implemented by electronic machinery. For example, electronic machinery may refer to the processor circuitry described herein, such as parent node processor(s) 40, repeater node processor(s) 50, and wireless terminal node processor(s) 60. Moreover, the term "processor circuitry" is not limited to mean one processor, but may include plural processors, with the plural processors operating at one or more sites. Moreover, as used herein the term "server" is not confined to one server unit but may encompasses plural servers and/or other electronic equipment and may be co-located at one site or distributed to different sites. With these understandings, FIG. 11 shows an example of electronic machinery, e.g., processor circuitry as comprising one or more processors 290, program instruction memory 292; other memory 294 (e.g., RAM, cache, etc.); input/output interfaces 296 and 297, peripheral interfaces 298; support circuits 299; and busses 300 for communication between the aforementioned units. The processor(s) 290 may comprise the processor circuitries described herein, for example, parent node processor(s) 40, repeater node processor(s) 50, and wireless terminal node processor(s) 60.

A memory or register described herein may be depicted by memory 294, or any computer-readable medium, may be one or more of readily available memory such as random access memory (RAM), read only memory (ROM), floppy disk, hard disk, flash memory or any other form of digital storage, local or remote, and is preferably of non-volatile nature, as and such may comprise memory. The support circuits 299 are coupled to the processors 290 for supporting the processor in a conventional manner. These circuits include cache, power supplies, clock circuits, input/output circuitry and subsystems, and the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system and is capable of being performed using any CPU architecture.

The functions of the various elements including functional blocks, including but not limited to those labeled or described as "computer", "processor" or "controller", may be provided by hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

The term configured may relate to the capacity of a device whether the device is in an operational or non-operational state. Configured may also refer to specific settings in a device that effect the operational characteristics of the device whether the device is in an operational or nonoperational state. For example, the hardware, software, firmware, registers, memory values, and/or the like may be "configured" within a device, whether the device is in an operational or nonoperational state, to provide the device with specific characteristics.

Nodes that communicate using the air interface also have suitable radio communications circuitry. Moreover, the technology disclosed herein may additionally be embodied entirely within any form of computer-readable memory, such as solid-state memory, magnetic disk, or optical disk containing an appropriate set of computer instructions that would cause a processor to carry out the techniques described herein.

Moreover, each functional block or various features of the wireless terminal 30, parent node 22, and repeater node 28 employed in each of the embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the technology disclosed herein is directed to solving radio communications-centric issues and is necessarily rooted in computer technology and overcomes problems specifically arising in radio communications. Moreover, the technology disclosed herein improves basic function of a radio access network, e.g., methods and procedures to allow for better use of spectrum especially in environments where a single base station or gNb may not be able to overcome propagation losses due to propagation loss from outdoor to indoor environments.

One or more of the following documents, all of which are incorporated by reference herein, may be pertinent to the technology described herein. All specifications are assumed to be those closest to those around release 16.4 if updated up to September 2021, except TR 38.874 updated last November 2018.

3GPP TS38.401, NG-RAN; Architecture description
3GPP TR 38.874, Study on Integrated Access and Backhaul
3GPP TS 38.473 F1 application protocol (FLAP)
3GPP TS 38.470, NG-RAN; F1 general aspects and principles
https://www.sharetechnote.com/html/5G/5G_ResourceGrid.html
3GPP TS38.211 v16.7.0 NR; Physical channels and mod
3GPP TS38.213 v16.7.0 Physical layer procedures for control
RP-213700, Study on NR Network-controlled Repeaters, RAN #94
RP-212703, (Draft) Study on Smart Repeaters, RAN #94

The technology disclosed herein encompasses one or more of the following non-limiting, non-exclusive example embodiments and modes:

Example Embodiment 1: A repeater node of a telecommunications network which wirelessly communicates with a parent node and another node, the repeater node comprising:
    receiver circuitry configured to receive a frame of information from the parent node;
    processor circuitry configured to include a customized control signal in the frame of information received from the parent node, the customized control signal being customized for the repeater node;
    transmitter circuitry configured to transmit the frame of information which includes the customized control signal to the another node.

Example Embodiment 2: The repeater node of Example Embodiment 1, wherein the processor circuitry is further configured to generate the customized control signal.

Example Embodiment 3: The repeater node of Example Embodiment 1, wherein the customized control signal is at least one of a reference signal, channel state information, and a signal synchronization block.

Example Embodiment 4: The repeater node of Example Embodiment 1, wherein the customized control signal comprises a broadcast channel.

Example Embodiment 5: The repeater node of Example Embodiment 1, wherein:
    the processor circuitry is further configured to generate a repeater node capabilities message, the repeater node capabilities message being configured to communicate to the parent node that the repeater node is configured to include the customized control signal in the frame of information received from the parent node; and
    the transmitter circuitry is further configured to transmit the repeater node capabilities message to the parent node.

Example Embodiment 6: The repeater node of Example Embodiment 1, wherein:
    the receiver circuitry is further configured to receive from the parent node a resource allocation message, the resource allocation message being configured to allocate to the repeater node available radio resources eligible for inclusion of the customized control signal by the repeater node; and the processor circuitry is further configured to include the customized control signal in the available radio resources.

Example Embodiment 7: The repeater node of Example Embodiment 6, resource allocation message comprises a (re)configuration message.

Example Embodiment 8: A method in a repeater node of a telecommunications network which wirelessly communicates with a parent node and another node, the method comprising:
receiving a frame of information from the parent node;
including a customized control signal in the frame of information received from the parent node, the customized control signal being customized for the repeater node;
transmitting the frame of information which includes the customized control signal to the another node.

Example Embodiment 9: The method of Example Embodiment 8, further comprising generating the customized control signal.

Example Embodiment 10: The method of Example Embodiment 8, wherein the customized control signal is at least one of a reference signal, channel state information, and a signal synchronization block.

Example Embodiment 11: The method of Example Embodiment 8, wherein the customized control signal comprises a broadcast channel.

Example Embodiment 12: The method of Example Embodiment 8, further comprising:
generating a repeater node capabilities message, the repeater node capabilities message being configured to communicate to the parent node that the repeater node is configured to include the customized control signal in the frame of information received from the parent node; and
transmitting the repeater node capabilities message to the parent node.

Example Embodiment 13: The method of Example Embodiment 8, further comprising:
receiving from the parent node a resource allocation message, the resource allocation message being configured to allocate to the repeater node available radio resources eligible for inclusion of the customized control signal by the repeater node; and
including the customized control signal in the available radio resources.

Example Embodiment 14: A parent node of a telecommunications network which wirelessly communicates with a repeater node, the parent node comprising:
processor circuitry configured to allocate, to the repeater node, available radio resources, the available radio resources being eligible for inclusion by the repeater node of a customized control signal, the customized control signal being customized for the repeater node; and
transmitter circuitry configured to transmit to the repeater node the frame of information which includes the available radio resources.

Example Embodiment 15: The parent node of Example Embodiment 14, wherein the processor circuitry is further configured to generate a message which informs the repeater node of the available radio resources.

Example Embodiment 16: The parent node of Example Embodiment 14, wherein the processor circuitry is further configured to generate a resource allocation message which informs the repeater node of the available radio resources and wherein the transmitter circuitry is further configured to transmit the resource allocation message to the repeater node.

Example Embodiment 17: The parent node of Example Embodiment 16, resource allocation message comprises a (re)configuration message.

Example Embodiment 18: The parent node of Example Embodiment 14, wherein the available radio resources are eligible for use by the repeater node as at least one of a reference signal, channel state information, and a signal synchronization block.

Example Embodiment 19: The parent node of Example Embodiment 14, wherein the available radio resources are eligible for use by the repeater node as a broadcast channel.

Although the description above contains many specificities, these should not be construed as limiting the scope of the technology disclosed herein but as merely providing illustrations of some of the presently preferred embodiments of the technology disclosed herein. The scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." The above-described embodiments could be combined with one another. All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims.

What is claimed is:

1. A repeater node of a telecommunications network which wirelessly communicates with a parent node and another node, the repeater node comprising:
receiver circuitry configured to receive a frame of information from the parent node, the frame of information including radio resources transmitted by the parent node with zero power;
processor circuitry configured to:
generate a customized control signal, the customized control signal being customized by the repeater node, and;
generate a modified frame of information from the frame of information by inserting the customized control signal into the radio resources which were transmitted by the parent node with the zero power; and
transmitter circuitry configured to transmit the modified frame of information to the another node.

2. The repeater node of claim 1, wherein the customized control signal comprises at least one of a reference signal, channel state information, and a signal synchronization block.

3. The repeater node of claim 1, wherein:
the receiver circuitry is further configured to receive from the parent node a resource allocation message via signaling dedicated to the repeater node, the resource allocation message being configured to allocate to the repeater node available radio resources within the frame of information, the available radio resources being eligible for insertion of the customized control signal by the repeater node; and the processor circuitry is further configured to insert the customized control signal in the available radio resources.

4. The repeater node of claim 3, wherein the resource allocation message comprises a (re)configuration message.

5. The repeater node of claim 1, wherein the customized control signal comprises a broadcast channel.

6. A method in a repeater node of a telecommunications network which wirelessly communicates with a parent node and another node, the method comprising:

receiving a frame of information from the parent node, the frame of information including radio resources transmitted by the parent node with zero power;

generating a customized control signal, the customized control signal being customized by the repeater node;

generate a modified frame of information from the frame of information by inserting a customized control signal into the radio resources which were transmitted by the parent node with the zero power; and transmitting the modified frame of information which includes the customized control signal to the another node.

7. A parent node of a telecommunications network which wirelessly communicates with a repeater node, the parent node comprising:

processor circuitry configured to allocate, to the repeater node, available radio resources, the available radio resources being eligible for generation by the repeater node of a customized control signal and insertion by the repeater node of the customized control signal, the customized control signal being customized by the repeater node; and transmitter circuitry configured to transmit to the repeater node a frame of information which includes the available radio resources, wherein the available radio resources are transmitted with zero power.

8. The parent node of claim 7, wherein the processor circuitry is further configured to generate a resource allocation message which informs the repeater node of the available radio resources and wherein the transmitter circuitry is further configured to transmit the resource allocation message to the repeater node.

9. The parent node of claim 8, wherein the resource allocation message comprises a (re)configuration message.

10. The parent node of claim 7, wherein the available radio resources are eligible for use by the repeater node as at least one of a reference signal, channel state information, and a signal synchronization block.

11. The parent node of claim 7, wherein the available radio resources are eligible for use by the repeater node as a broadcast channel.

* * * * *